United States Patent
Miyada et al.

(10) Patent No.: US 12,401,883 B2
(45) Date of Patent: Aug. 26, 2025

(54) SYSTEM, IMAGING APPARATUS, INFORMATION PROCESSING APPARATUS, INFORMATION PROCESSING METHOD, AND INFORMATION PROCESSING PROGRAM

(71) Applicant: Sony Interactive Entertainment Inc., Tokyo (JP)

(72) Inventors: Naoyuki Miyada, Tokyo (JP); Hideki Yanagisawa, Kanagawa (JP); Mamiko Ishida, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 195 days.

(21) Appl. No.: 18/253,070

(22) PCT Filed: Nov. 16, 2021

(86) PCT No.: PCT/JP2021/042137
§ 371 (c)(1),
(2) Date: May 16, 2023

(87) PCT Pub. No.: WO2022/113834
PCT Pub. Date: Jun. 2, 2022

(65) Prior Publication Data
US 2023/0353860 A1    Nov. 2, 2023

(30) Foreign Application Priority Data
Nov. 25, 2020  (JP) .................. 2020-195149

(51) Int. Cl.
*H04N 23/611* (2023.01)
*G06F 1/16* (2006.01)
(Continued)

(52) U.S. Cl.
CPC .......... *H04N 23/611* (2023.01); *G06F 1/163* (2013.01); *G06T 7/73* (2017.01); *H04N 23/667* (2023.01);
(Continued)

(58) Field of Classification Search
CPC .... H04N 23/611; H04N 23/667; G06F 1/163; G06F 3/017; G06F 3/0304; G06T 7/73;
(Continued)

(56) References Cited

U.S. PATENT DOCUMENTS 8,350,919 B2 * 1/2013 Schindler ............... H04N 23/60
348/208.16
8,614,673 B2 * 12/2013 Binder ................... G01S 3/7864
345/158
(Continued)

FOREIGN PATENT DOCUMENTS

| JP | 2014115457 A | 6/2014 |
| JP | 2014127987 A | 7/2014 |
| JP | 2019213764 A | 12/2019 |

OTHER PUBLICATIONS

Tan, et al., "Understanding the Nature of First-Person Videos: Characterization and Classification Using Low-Level Features", Institute of Electrical and Electronics Engineers Conference on Computer Vision and Pattern Recognition Workshops, Jun. 23, 2014, pp. 549-556.
(Continued)

*Primary Examiner* — Grant Sitta
(74) *Attorney, Agent, or Firm* — Kilpatrick Townsend & Stockton LLP

(57) ABSTRACT

An imaging apparatus generates a first image signal by synchronously scanning all pixels at a predetermined timing and performs image capturing in either a first imaging mode or a second imaging mode An information processing appa-
(Continued)

ratus recognizes the user on the basis of the first image signal, calculates coordinate information regarding the user, determines whether the image capturing is performed in the first imaging mode or the second imaging mode, on the basis of the coordinate information, performs, in a case where it is determined that the image capturing is performed in the first imaging mode, a first process on the basis of the coordinate information calculated in the first imaging mode, and performs, in a case where it is determined that the image capturing is performed in the second imaging mode, a second process on the basis of the coordinate information calculated in the second imaging mode.

16 Claims, 15 Drawing Sheets

(51) Int. Cl.
*G06T 7/73* (2017.01)
*H04N 23/667* (2023.01)

(52) U.S. Cl.
CPC ........... *G06T 2207/10024* (2013.01); *G06T 2207/20081* (2013.01); *G06T 2207/30196* (2013.01)

(58) Field of Classification Search
CPC . G06T 2207/10024; G06T 2207/20081; G06T 2207/30196; A63F 13/213; A63F 13/25; A63F 13/428
See application file for complete search history.

(56) References Cited

U.S. PATENT DOCUMENTS

| | | | | |
|---|---|---|---|---|
| 9,245,389 | B2 | 1/2016 | Sako | |
| 9,256,284 | B2 | 2/2016 | Hanaya | |
| 9,536,351 | B1* | 1/2017 | Côté | G06F 3/011 |
| 9,832,368 | B1* | 11/2017 | Agrawal | H04N 23/62 |
| 9,860,452 | B2* | 1/2018 | Zaitsev | H04N 23/45 |
| 10,002,297 | B2* | 6/2018 | Sengupta | G06F 21/32 |
| 10,430,966 | B2* | 10/2019 | Varadarajan | G06V 20/53 |
| 10,440,261 | B2* | 10/2019 | Cheaz | H04N 23/611 |
| 10,803,616 | B1* | 10/2020 | Twigg | G06V 20/64 |
| 2008/0144886 | A1* | 6/2008 | Pryor | G06V 40/20 382/103 |
| 2009/0131171 | A1 | 5/2009 | Miyazaki | |
| 2010/0111363 | A1* | 5/2010 | Kelly | G06F 21/316 382/103 |
| 2010/0266206 | A1* | 10/2010 | Jo | H04N 23/611 382/190 |
| 2011/0244956 | A1* | 10/2011 | Sakakibara | A63F 13/213 463/31 |
| 2012/0293680 | A1* | 11/2012 | Guan | H04N 23/90 348/222.1 |
| 2013/0182139 | A1* | 7/2013 | Brunner | G06V 10/242 348/222.1 |
| 2014/0160129 | A1* | 6/2014 | Sako | G06T 19/006 345/427 |
| 2014/0184854 | A1* | 7/2014 | Musatenko | H04N 23/69 348/240.2 |
| 2014/0186002 | A1 | 7/2014 | Hanaya | |
| 2014/0198962 | A1* | 7/2014 | Anabuki | G06T 7/0014 382/128 |
| 2014/0361986 | A1* | 12/2014 | Won | G06F 3/0304 345/156 |
| 2015/0109528 | A1* | 4/2015 | Choi | H04N 5/145 348/460 |
| 2015/0350505 | A1* | 12/2015 | Malkin | G03B 17/00 348/357 |
| 2016/0241783 | A1* | 8/2016 | Fukui | H04N 23/62 |
| 2016/0287994 | A1* | 10/2016 | Tamaoki | A63F 13/80 |
| 2017/0249010 | A1 | 8/2017 | Jung et al. | |
| 2018/0088890 | A1* | 3/2018 | Pohl | G06F 3/147 |
| 2018/0311585 | A1* | 11/2018 | Osman | A63F 13/26 |
| 2018/0356880 | A1* | 12/2018 | Kashihara | G06F 3/0346 |
| 2019/0070506 | A1* | 3/2019 | Stafford | A63F 13/533 |
| 2020/0068111 | A1* | 2/2020 | Naing | H04N 23/73 |

OTHER PUBLICATIONS

Yee, "How to Use a Digital Camera, Camcorder, or GoPro as a Webcam", Available online at: https://www.pcworld.com/article/398987, Apr. 3, 2020, pp. 1-17.

International Search Report for corresponding Application No. PCT/JP2021/042137, 4 pages, dated Feb. 8, 2022.

* cited by examiner

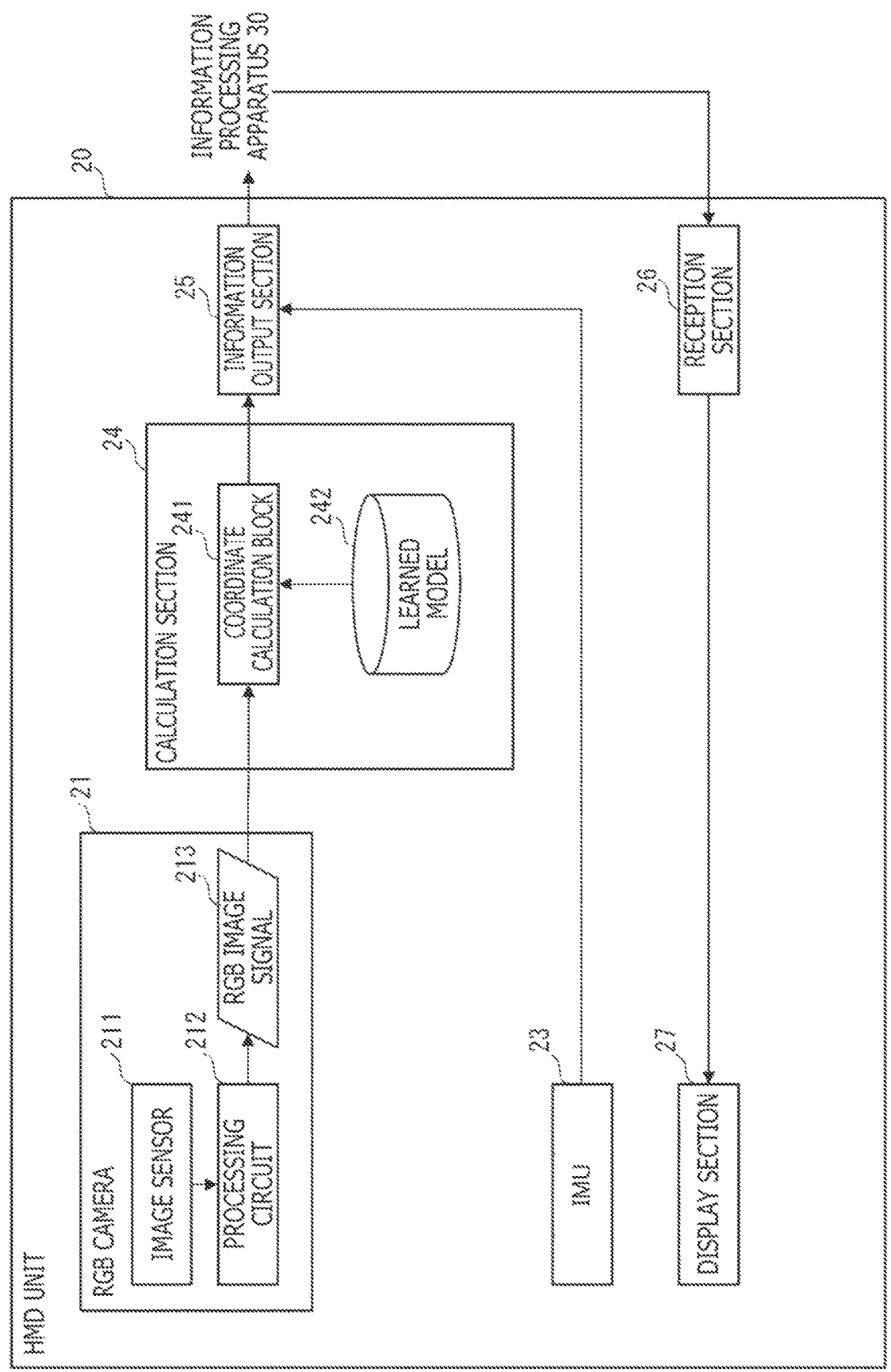

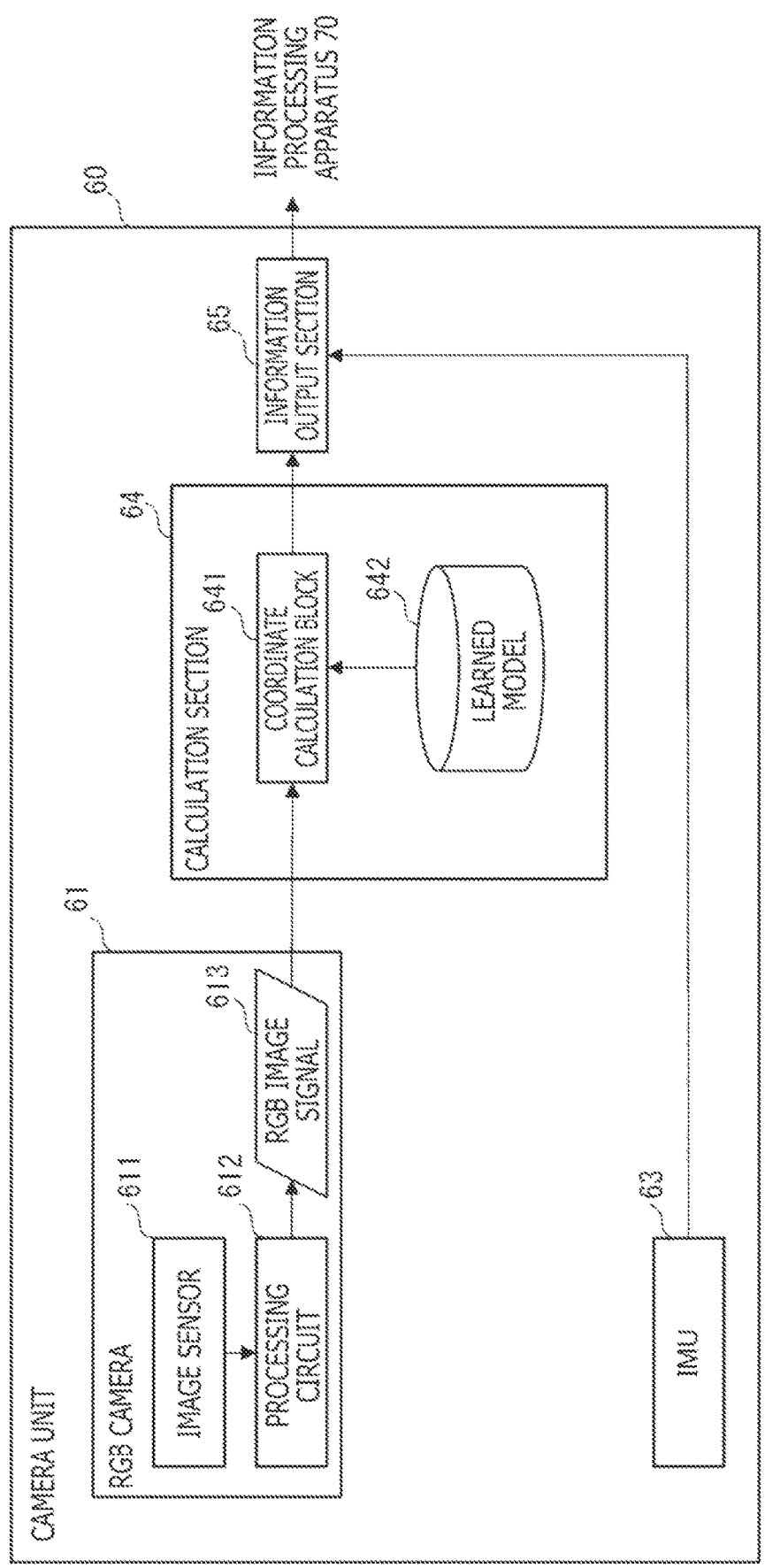

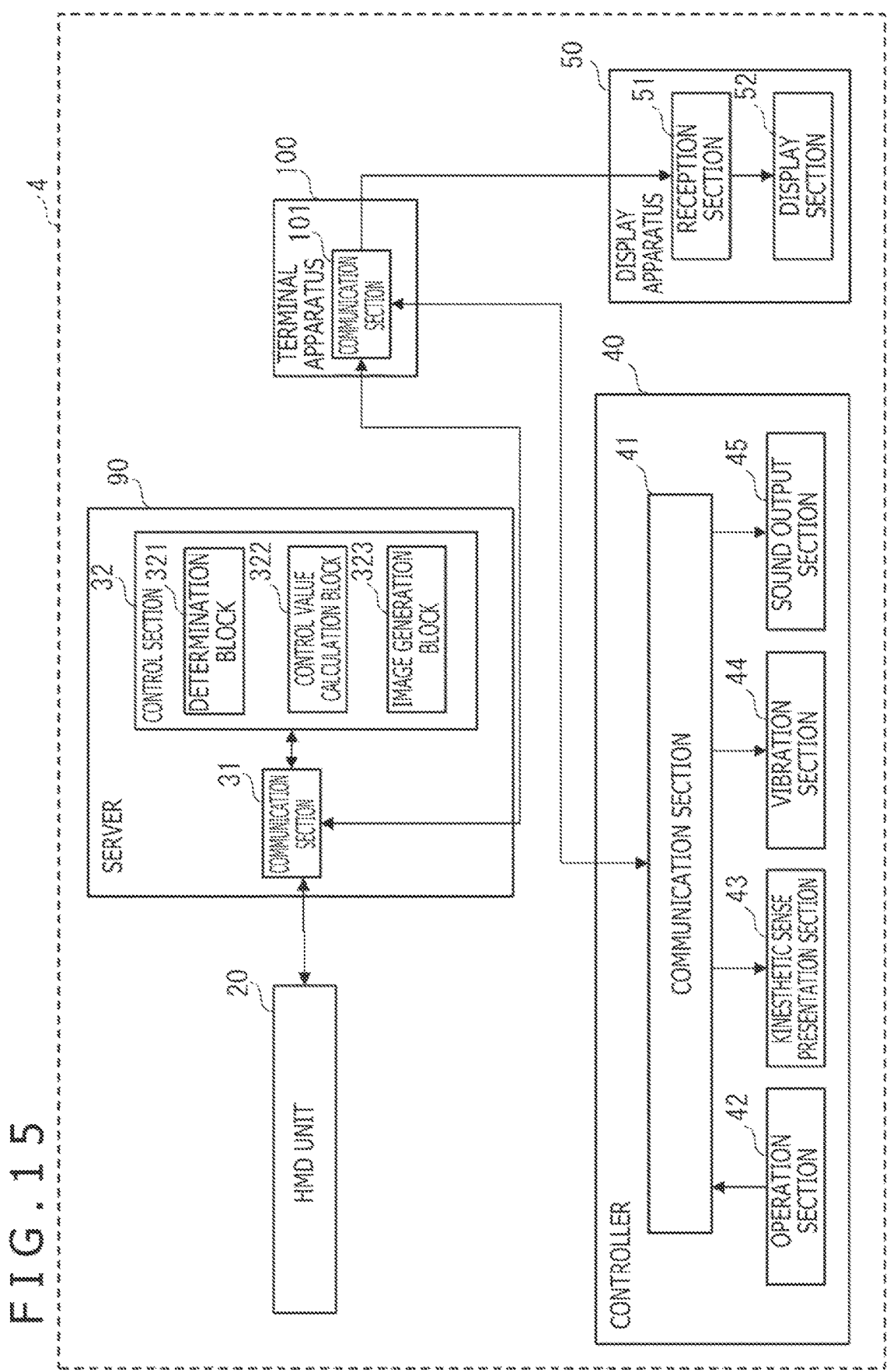

SYSTEM, IMAGING APPARATUS, INFORMATION PROCESSING APPARATUS, INFORMATION PROCESSING METHOD, AND INFORMATION PROCESSING PROGRAM

TECHNICAL FIELD

The present invention relates to a system, an imaging apparatus, an information processing apparatus, an information processing method, and an information processing program.

BACKGROUND ART

There has conventionally been known an operation apparatus that is connected to an information processing apparatus such as a computer or a game apparatus and that transmits an operation signal to the information processing apparatus (for example, see PTL 1).

A controller (operation apparatus) disclosed in PTL 1 includes a left grip part and a right grip part to be gripped by user's left and right hands, and direction buttons and operation buttons disposed on a front surface of the controller.

CITATION LIST

Patent Literature

[PTL 1] U.S. Patent Application Publication No. 2009/0131171

SUMMARY

Technical Problem

Meanwhile, there is a problem that the degree of freedom of the user's motion is reduced since the controller, etc., disclosed in PTL 1 is gripped by user's left and right hands. Therefore, there has been considered a technology using an operation apparatus that recognizes voices and gestures corresponding to body motions of a user. However, an pointing-device-type operation apparatus requires a user to keep a cursor position at a certain position and thus causes the user to feel physical fatigue, in some cases. Further, a posture-detection-type operation apparatus requires a user to wear a marker or an attachment to be recognized. In both cases, there is a problem concerning the convenience of users.

Therefore, an object of the present invention is to provide a system, an imaging apparatus, an information processing apparatus, an information processing method, and an information processing program that provide great convenient for users and that can precisely perform a process according to an imaging mode.

Solution to Problem

According to a certain aspect of the present invention, there is provided a system including an imaging apparatus that includes a first image sensor for generating a first image signal by synchronously scanning all pixels at a predetermined timing and that performs image capturing in either a first imaging mode in which an image is captured from a first-person viewpoint corresponding to a user's viewpoint or a second imaging mode in which an image of a user is captured from a third-person viewpoint with respect to the user, a first computation processing device that recognizes the user on the basis of the first image signal and that calculates coordinate information regarding the user on the basis of the first image signal, a second computation processing device that determines whether the image capturing is performed in the first imaging mode or the second imaging mode, on the basis of the coordinate information, and a third computation processing device that performs, in a case where it is determined that the image capturing is performed in the first imaging mode, a first process on the basis of the coordinate information calculated in the first imaging mode and that performs, in a case where it is determined that the image capturing is performed in the second imaging mode, a second process on the basis of the coordinate information calculated in the second imaging mode.

According to another aspect of the present invention, there is provided an imaging apparatus including an imaging section that includes a first image sensor for generating a first image signal by synchronously scanning all pixels at a predetermined timing and that performs image capturing in either a first imaging mode in which an image is captured from a first-person viewpoint corresponding to a user's viewpoint or a second imaging mode in which an image of a user is captured from a third-person viewpoint with respect to the user, a computation processing section that recognizes the user on the basis of the first image signal and that calculates coordinate information regarding the user on the basis of the first image signal, and an information output section that outputs the coordinate information.

According to still another aspect of the present invention, there is provided an information processing apparatus including an acquisition section that acquires coordinate information from an imaging apparatus including a first image sensor for generating a first image signal by synchronously scanning all pixels at a predetermined timing, the imaging apparatus being configured to perform image capturing in either a first imaging mode in which an image is captured from a first-person viewpoint corresponding to a user's viewpoint or a second imaging mode in which an image of a user is captured from a third-person viewpoint with respect to the user, recognize the user on a basis of the first image signal, calculate the coordinate information regarding the user on the basis of the first image signal, and output the coordinate information, a first computation processing section that determines whether the image capturing is performed in the first imaging mode or the second imaging mode, on the basis of the coordinate information, and a second computation processing section that performs, in a case where it is determined that the image capturing is performed in the first imaging mode, a first process on the basis of the coordinate information calculated in the first imaging mode and that performs, in a case where it is determined that the image capturing is performed in the second imaging mode, a second process on the basis of the coordinate information calculated in the second imaging mode.

According to yet another aspect of the present invention, there is provided an information processing method including an acquisition step of acquiring a first image signal from an imaging apparatus that includes a first image sensor for generating the first image signal by synchronously scanning all pixels at a predetermined timing and that performs image capturing in either a first imaging mode in which an image is captured from a first-person viewpoint corresponding to a user's viewpoint or a second imaging mode in which an image of a user is captured from a third-person viewpoint with respect to the user, a calculation step of recognizing the user on the basis of the first image signal and calculating coordinate information regarding the user on the basis of the first image signal, a determination step of determining whether the image capturing is performed in the first imaging mode or the second imaging mode, on the basis of the coordinate information, and a processing step of performing, in a case where it is determined that the image capturing is performed in the first imaging mode, a first process on the basis of the coordinate information calculated in the first imaging mode and performing, in a case where it is determined that the image capturing is performed in the second imaging mode, a second process on the basis of the coordinate information calculated in the second imaging mode.

According to yet another aspect of the present invention, there is provided an information processing program for causing a computer to implement a function of acquiring a first image signal from an imaging apparatus that includes a first image sensor for generating the first image signal by synchronously scanning all pixels at a predetermined timing and that performs image capturing in either a first imaging mode in which an image is captured from a first-person viewpoint corresponding to a user's viewpoint or a second imaging mode in which an image of a user is captured from a third-person viewpoint with respect to the user, a function of recognizing the user on the basis of the first image signal and calculating coordinate information regarding the user on the basis of the first image signal, a function of determining whether the image capturing is performed in the first imaging mode or the second imaging mode, on the basis of the coordinate information, and a function of performing, in a case where it is determined that the image capturing is performed in the first imaging mode, a first process on the basis of the coordinate information calculated in the first imaging mode and performing, in a case where it is determined that the image capturing is performed in the second imaging mode, a second process on the basis of the coordinate information calculated in the second imaging mode.

With the abovementioned configurations, coordinate information regarding a user is calculated on the basis of an image signal, and an imaging mode is determined on the basis of the calculated coordinate information. Accordingly, high convenience can be offered to the user, and a process can properly be performed according to the imaging mode.

BRIEF DESCRIPTION OF DRAWINGS

FIG. 3 is a block diagram depicting a schematic configuration of an HMD (Head-Mounted Display) unit in the system according to the first embodiment of the present invention.

FIG. 10 is a block diagram depicting a schematic configuration of a camera unit in the system according to the second embodiment of the present invention.

FIG. 15 is a block diagram depicting a schematic configuration of a system according to a fourth embodiment of the present invention.

DESCRIPTION OF EMBODIMENTS

Hereinafter, some embodiments of the present invention will be explained in detail with reference to the attached drawings. It is to be noted that components having substantially the same functional configuration are denoted by the same reference sign throughout the present description and the drawings, and a redundant explanation thereof will be omitted.

First Embodiment

Figure 1A:
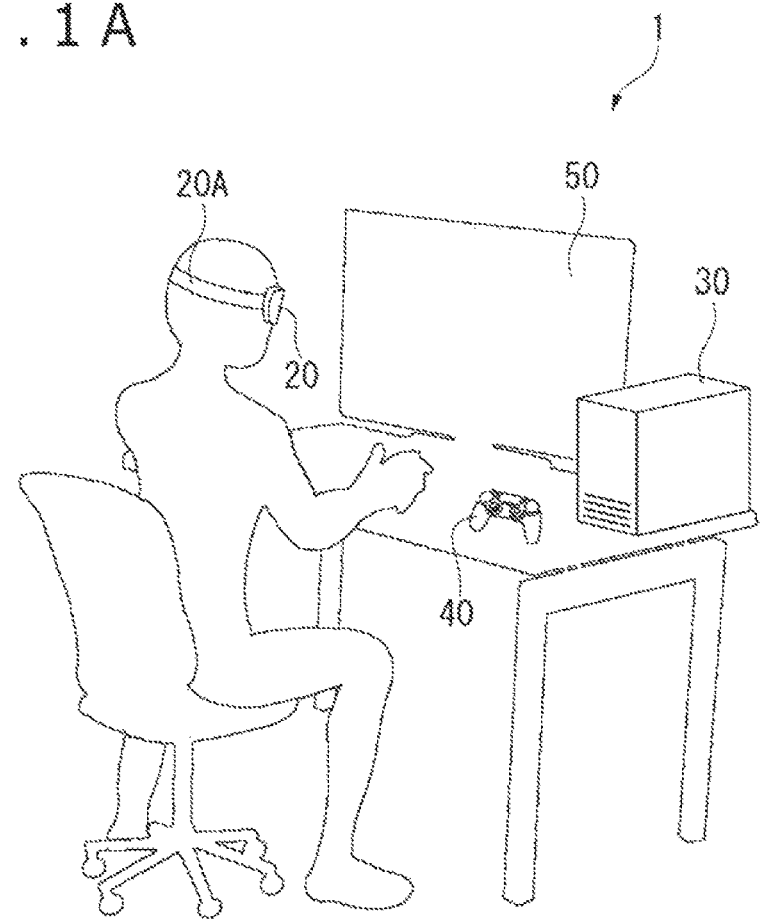
FIG. 1A is a schematic diagram depicting the entirety of a system according to a first embodiment of the present invention.
Figure 1B:
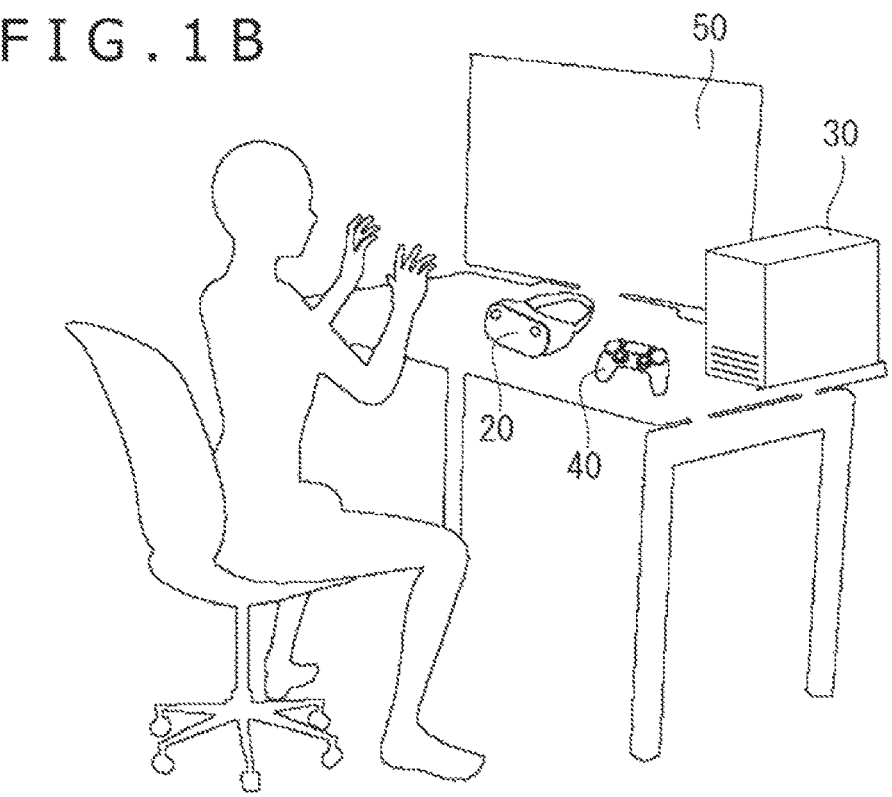
FIG. 1B is another schematic diagram depicting the entirety of the system according to the first embodiment of the present invention.
Figure 2:
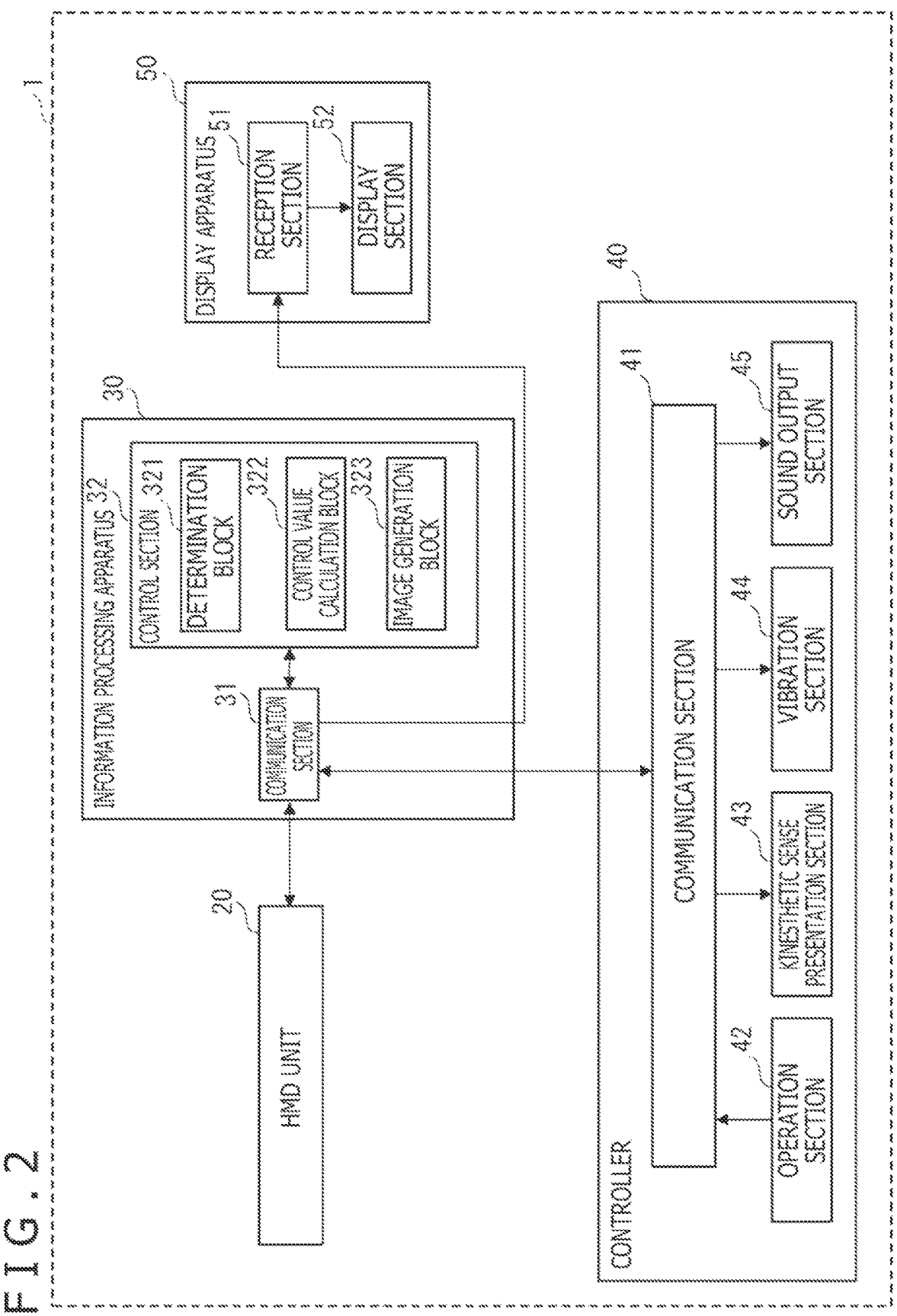
FIG. 2 is a block diagram depicting a schematic configuration of the system according to the first embodiment of the present invention.

FIGS. 1A and 1B are schematic diagrams each depicting the entirety of a system 1 according to a first embodiment of the present invention. FIG. 2 is a block diagram depicting a schematic configuration of the system 1.

The system 1 according to the present embodiment is a game system including an HMD unit 20 which is a first sensor apparatus, an information processing apparatus 30, a controller 40, and a display apparatus 50, as depicted in FIG. 1A.

The information processing apparatus 30 is connected to the HMD unit 20, the controller 40, and the display apparatus 50 via a wired or wireless network, as depicted in FIG. 2.

In the system 1, the information processing apparatus 30 proceeds with a game according to information transmitted from the HMD unit 20 and the controller 40, and an in-execution screen, e.g., a game screen, of the information processing apparatus 30 is displayed on the HMD unit 20 and the display apparatus 50.

In the present embodiment, the HMD unit 20 calculates coordinate information regarding a user who is a game player, and transmits the coordinate information to the information processing apparatus 30. Here, the coordinate information regarding the user includes at least one of coordinate information regarding a feature point concerning a posture of the user, coordinate information regarding a feature point concerning an arm shape of the user, and coordinate information regarding a feature point concerning a hand and finger shape of the user.

By calculating and outputting the coordinate information regarding the user, the HMD unit 20 also functions as an operation apparatus for receiving an operation made by the user, similarly to the controller 40.

In the present embodiment, the HMD unit 20 can be used while being worn on the head of the user as depicted in FIG. 1A, and can also be used while being placed on a table or the like as depicted in FIG. 1B.

In a case where the HMD unit 20 is used while being worn on the head of the user as depicted in FIG. 1A, the HMD unit 20 has a function of a display apparatus and a function of an imaging apparatus for capturing an image in a first imaging mode. The first imaging mode is a mode in which an image is captured from a first-person viewpoint, i.e., the user's viewpoint. The HMD unit 20 can be put on or taken off from the head of the user. As depicted in the example of FIG. 1A, the HMD unit 20 has an attachment part 20A that can attach the HMD unit 20 to the body of the user, and can be worn on the head of the user through the attachment part 20A. It is to be noted that the HMD unit 20 and the attachment part 20A may be formed into a band shape as in the example of FIG. 1A, or may be formed into any other shape such as a helmet shape or a glasses shape. In addition, when the user is to wear the HMD unit 20, the information processing apparatus 30 may preferably display tutorials or the like on the HMD unit 20 such that guidance on the proper use of the attachment part 20A is provided to the user, for example.

On the other hand, in a case where the HMD unit 20 is used while being placed on a table or the like as depicted in FIG. 1B, the HMD unit 20 has a function of an imaging apparatus for capturing an image in a second imaging mode. The second imaging mode is a mode in which an image of the user is captured from a third-person viewpoint with respect to the user. Further, in order to capture the image of the user from the third-person viewpoint with respect to the user, the HMD unit 20 is placed such that the user is included in the field of view of the HMD unit 20. For example, the HMD unit 20 is placed at a distance of approximately 1 meter from the user. In the example of FIG. 1B, the HMD unit 20 is placed near the display apparatus 50. The optimal position of the HMD unit 20 depends on the purpose. For example, it is desired to dispose the HMD unit 20 in such a position that a target to be recognized, such as the whole body, the upper body, or a hand of the user, is included in the field of view of the HMD unit 20 according to the contents of a game to be played. It is to be noted that, upon the placement of the HMD unit 20, the information processing apparatus 30 may preferably display tutorials or the like on the display apparatus 50 such that guidance on the proper position of the HMD unit 20 is provided to the user, for example.

Whether to capture an image in the first imaging mode with the HMD unit 20 worn on the head or to capture an image in the second imaging mode with the HMD unit 20 placed on a table or the like is determined according to the purpose of the contents of a game to be played.

Hereinafter, the components of the system 1 will be explained. FIG. 3 is a block diagram depicting a schematic configuration of the HMD unit 20 in the system 1 according to the present embodiment of the present invention.

The HMD unit 20 includes an RGB camera 21 which is a first imaging device, an IMU (Inertial Measurement Unit) 23, a calculation section 24 which functions as a first computation processing device, an information output section 25, a reception section 26, and a display section 27.

The RGB camera 21 includes an image sensor 211 which is a first image sensor, and a processing circuit 212 which is connected to the image sensor 211. The image sensor 211 generates an RGB image signal 213 which is a first image signal, by synchronously scanning all the pixels in a predetermined cycle or at a predetermined timing corresponding to an operation made by the user, for example. The processing circuit 212 converts the RGB image signal 213 to a suitable format to be saved or transmitted, for example. In addition, the processing circuit 212 gives a timestamp to the RGB image signal 213.

It is to be noted that the signal from which an image can be created is referred to as an image signal herein. Therefore, the RGB image signal 213 is one example of the image signal.

The IMU 23 is an inertial sensor that detects the attitude of the HMD unit 20 itself, or more specifically, the attitude of the image sensor 211. The IMU 23 acquires three-dimensional attitude information regarding the image sensor 211 in a predetermined cycle or at a predetermined timing, and outputs the attitude information to the information output section 25.

The calculation section 24 includes a coordinate calculation block 241 and a learned model 242, and calculates coordinate information regarding the user on the basis of the RGB image signal 213 generated by the RGB camera 21.

The coordinate calculation block 241 of the calculation section 24 recognizes the user by performing subject recognition on the basis of the RGB image signal 213, for example. In a case where a plurality of users are included in the field of view of the HMD unit 20, the coordinate calculation block 241 identifies each of the users.

Then, the coordinate calculation block 241 calculates coordinate information that indicates the positions of a plurality of joints of each of the recognized users, from the RGB image signal 213 according to the learned model 242. The positions of the plurality of joints of each user correspond to feature points concerning the posture of the user, feature points concerning the arm shape of the user, or feature points concerning the hand and finger shape of the user.

The learned model 242 may previously be constructed by executing supervised learning in which input data is an image of a person having a plurality of joints and in which correct data is coordination information that indicates the positions of the plurality of joints of the person, for example. It is to be noted that a detailed explanation of a specific method of the machine learning will be omitted because any of various publicly-known technologies can be used therefor. In addition, the calculation section 24 may be provided with a relation learning block, and the relation learning block may learn, each time the RGB image signal 213 is inputted, the relation between an image based on the inputted RGB image signal 213 and coordination information indicating the positions of the joints, to update the learned model 242.

The information output section 25 outputs the coordinate information regarding the user, which is calculated by the calculation section 24, and the attitude information obtained by the IMU 23 to the information processing apparatus 30.

The reception section 26 receives, from the information processing apparatus 30, information that indicates a display image generated by the information processing apparatus 30.

The display section 27 includes a display element such as an LCD (Liquid Crystal Display) or an organic EL (Electroluminescent), and an optical device such as a lens. The display section 27 displays the display image on the basis of the information received by the reception section 26, so that the display image can be presented to the user. It is to be noted that the display element of the display section 27 may be a transmissive display element or may be a non-transmissive display element.

In addition, a terminal apparatus such as a smartphone that can be attached to or detached from a casing of the HMD unit 20 may also be used as a display apparatus. Moreover, a wearable device such as AR (Augmented Reality) glasses or MR (Mixed Reality) glasses may also be used as the HMD unit 20.

As described so far, the HMD unit 20 performs processing from generation of the RGB image signal 213 to calculation of the coordination information regarding the user, alone, and can output the calculated coordinate information and the attitude information to the information processing apparatus 30 without outputting the RGB image signal 213. It is to be noted that the HMD unit 20 preferably has an independent power source.

Figure 4A:
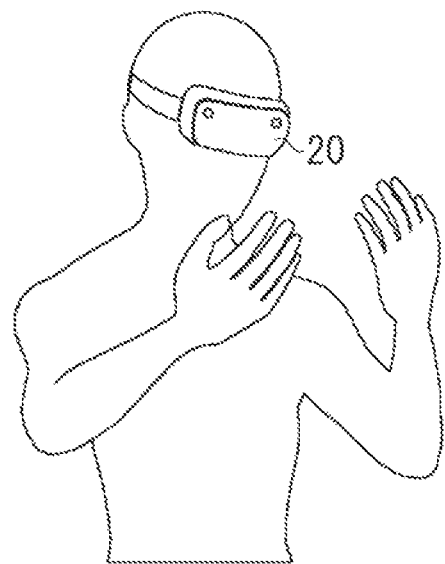
FIG. 4A is a diagram for explaining an imaging mode in the first embodiment of the present invention.
Figure 4B:
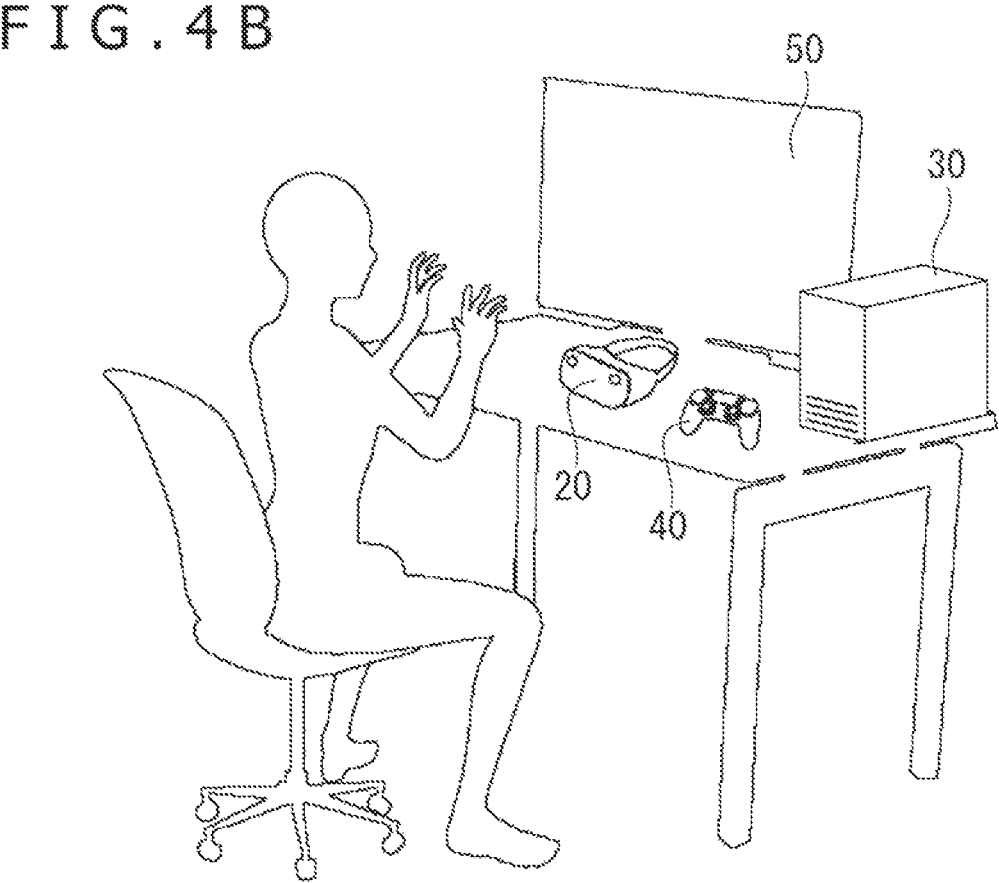
FIG. 4B is another diagram for explaining the imaging mode in the first embodiment of the present invention.

FIGS. 4A and 4B are diagrams for explaining imaging modes in the present embodiment.

As previously explained, the HMD unit 20 has the first imaging mode in which an image is captured from the first-person viewpoint, i.e., the user's viewpoint, and the second imaging mode in which an image of the user is captured from the third-person viewpoint with respect to the user.

In the first imaging mode, the user's hands are mainly included in the field of view of the HMD unit 20, as depicted in FIG. 4A. In some cases, the display apparatus 50 behind the hands (rear side) when viewed from the user is included in the field of view of the HMD unit 20. Further, in the first imaging mode, the head of the user is not included in the field of view of the HMD unit 20. For example, in a case where the user raises the both arms or makes a certain pose with fingers near a shoulder, the arms or fingers are not included in the field of view of the HMD unit 20.

On the other hand, in the second imaging mode, the user's upper body and hands are mainly included in the field of view of the HMD unit 20, as depicted in FIG. 4B. In a case where the user makes a certain pose with the arm or fingers, the arm or fingers are substantially completely included in the field of view of the HMD unit 20. Further, in the second imaging mode, the display apparatus 50 is not included in the field of view of the HMD unit 20.

Hence, in the present embodiment, a subject included in image data based on the generated image signal differs between the first imaging mode and the second imaging mode.

Referring back to FIG. 2, the information processing apparatus 30 is implemented by a computer equipped with a communication interface, a processor, and a memory, for example, and includes a communication section 31 and a control section 32 that function as a second computation processing device and a third computation processing device. The control section 32 includes the functions of a determination block 321, a control value calculation block 322, and an image generation block 323 that are implemented by the processor operating according to a program stored in the memory or a program received through the communication interface. The functions of these blocks will be explained in more detail below.

The communication section 31 receives coordinate information regarding the user and attitude information that are outputted from the information output section 25 of the HMD unit 20, and outputs a display image to be displayed on the display section 27 of the HMD unit 20. In addition, the communication section 31 is capable of mutually communicating with the controller 40, and outputs a display image to be displayed on the display apparatus 50.

The determination block 321 of the control section 32 determines whether image capturing is performed in the first imaging mode or the second imaging mode, on the basis of the coordinate information.

The determination block 321 performs recognition on the basis of coordinate information regarding a feature point concerning the posture of the user which is included in the coordinate information outputted from the HMD unit 20, for example. In a case where the user's face or head is included in the coordinate information, the determination block 321 determines that the HMD unit 20 captures the image in the second imaging mode. Similarly, the determination block 321 performs recognition on the basis of coordinate information regarding a feature point concerning the arm shape of the user which is included in the coordinate information, for example. In a case where the user's hand or fist is in front of the user's arm in reference to the coordinate information, the determination block 321 determines that the HMD unit 20 captures the image in the second imaging mode.

In contrast, in a case where the user's face or head is not included in the coordinate information outputted from the HMD unit 20 and where the user's hand or fist is behind the user arm in reference to the coordinate information, the determination block 321 determines that the HMD unit 20 captures the image in the first imaging mode.

It is to be noted that the determination block 321 may determine the imaging mode on the basis of the relative position of any other part in place of the abovementioned relative position of an arm, a hand, or a fist. For example, the determination block 321 may determine the imaging mode on the basis of the relative position of an end part of the body, or more specifically, a foot or a leg part of the user.

In addition, the abovementioned determination method may previously be set, or may be set by the user. Further, any other information may additionally be used to make the determination. For example, attitude information obtained by the IMU 23 of the HMD unit 20 may be used. For example, a relative positional relation between the user and the HMD unit 20 is detected on the basis of the attitude information obtained by the IMU 23, and the detected positional relation may be used for determination of the imaging mode. In addition, the imaging mode may be determined only on the basis of the attitude information obtained by the IMU 23 of the HMD unit 20.

In addition, in a case where a subject analysis is performed on the RGB image signal 213 generated by the HMD unit 20 and where a rectangular subject is determined to be included behind (on the rear side of) the user, it may be presumed that the display apparatus 50 is included in the field of view of the HMD unit 20. Accordingly, it may be determined that the HMD unit 20 captures the image in the first imaging mode.

Further, the HMD unit 20 may be equipped with a worn-state sensor that detects the state of the HMD unit 20 being worn on the user through the attachment part 20A, so that the determination can be made according to the worn state of the HMD unit 20 detected by the worn-state sensor. For example, in a case where the worn state indicates that "the HMD unit 20 is worn on the user," it may be determined that the image capturing is performed in the first imaging mode. In a case where the worn state indicates that "the HMD unit 20 is not worn on the user," it may be determined that the image capturing is performed in the second imaging mode. The worn-state sensor may include a contact sensor, an attachable/detachable sensor, or a switch, for example, according to the configuration of the attachment part 20A. In addition, in place of or in addition to the worn-state sensor, a contact sensor and an attitude sensor for detecting whether or not the HMD unit 20 is placed on a table or the like may be provided.

In a case where none of the determination methods explained above successfully determines the imaging mode, the user may be urged to make a particular pose. For example, the control section 32 displays a message "show your both palms" on the display section 27 of the HMD unit 20 and a display section 52 of the display apparatus 50.

In a case where the HMD unit 20 captures the image in the first imaging mode, the user shows the palms to the HMD unit 20 worn on the head, as depicted in FIG. 4A. Accordingly, the thumbs of the user's both hands are facing outward in reference to the coordinate information outputted from the HMD unit 20.

On the other hand, in a case where the HMD unit 20 captures the image in the second imaging mode, the user shows the palms to the HMD unit 20 placed on a table or the like, as depicted in FIG. 4B. Accordingly, the thumbs of the user's both hands are facing inward in reference to the coordinate information outputted from the HMD unit 20.

In either case, if a determination as to whether the hands are facing upward or downward and a determination as to whether or not the arms are crossing, for example, are made in a combined manner, the degree of precision of the determination can be increased.

As a result of urging the user to take a particular pose and checking the feature of the pose in the coordinate information in the abovementioned manner, the imaging mode can reliably be determined. It is to be noted that any pose other than the abovementioned ones can be adopted as long as the pose can be identified and provides a difference between the coordination information based on the first imaging mode and the coordination information based on the second imaging mode.

The control value calculation block 322 calculates a control value of feedback control on external apparatuses including the HMD unit 20, the controller 40, and the display apparatus 50, according to the imaging mode determined by the determination block 321. The HMD unit 20 and the controller 40 each function as an operation apparatus for receiving an operation made by the user, as previously explained. Therefore, according to the operation made by the user through either the HMD unit 20 or the controller 40, the control value calculation block 322 calculates a control value of feedback control on the external apparatuses including the HMD unit 20, the controller 40, and the display apparatus 50. The calculated control value is outputted to the controller 40 via the communication section 31.

The image generation block 323 generates a display image that indicates the state of the user, according to the imaging mode determined by the determination block 321. More specifically, the image generation block 323 generates a display image to be displayed on the display section 27 of the HMD unit 20 and the display section 52 of the display apparatus 50, according to the control value calculated by the control value calculation block 322. The generated display image is outputted to the HMD unit 20 and the display apparatus 50 via the communication section 31. It is to be noted that examples of the display image include what is called a first person view image that reproduces the user's viewpoint and what is called a third person view image in which the user is viewed from the outside. Which type of display image is to be used is decided according to the purpose such as the contents or a scene of a game to be played.

In addition, calculation of the control value and generation of the display image will be explained in detail in connection with an explanation of the configurations of the controller 40 and the display apparatus 50, which will be given later.

The controller 40 includes a communication section 41, an operation section 42, a kinesthetic sense presentation section 43, a vibration section 44, and a sound output section 45, as depicted in FIG. 2. The user can perform a variety of operations for the game by operating the controller 40.

The communication section 41 receives the control value outputted by the communication section 31 of the information processing apparatus 30, and outputs the control value to the kinesthetic sense presentation section 43, the vibration section 44, and the sound output section 45. In addition, the communication section 41 outputs, to the information processing apparatus 30, information regarding the user operation received by the operation section 42.

The operation section 42 is equipped with a plurality of operating elements such as buttons and pads, and receives an operation inputted by the user through the operating elements.

The kinesthetic sense presentation section 43 is provided on at least some of the operating elements of the operation section 42, and provides the user with a force of resisting the user operation or a force linked with the user operation, according to the control value supplied from the information processing apparatus 30. Specifically, the kinesthetic sense presentation section 43 may include an actuator or a motor having a rotary motor, for example. As a kinesthetic sense presentation device serving as the kinesthetic sense presentation section 43, a widely-known device can be adopted. Therefore, the detailed explanation thereof is omitted.

The vibration section 44 generates a vibration according to the control value supplied from the information processing apparatus 30. The vibration section 44 includes a motor, for example. The vibration section 44 generates a vibration in a case where an operation is made by the user. Accordingly, the user can be informed that the operation has properly been performed and recognized by the information processing apparatus 30.

The sound output section 45 generates a sound according to the control value supplied from the information processing apparatus 30. The sound output section 45 includes a loudspeaker, for example. The sound output section 45 outputs a sound in a case where an operation is made by the user. Accordingly, the user can be informed that the operation has properly been performed and recognized by the information processing apparatus 30.

It is to be noted that, if at least one of a vibration from the vibration section 44 and sound output from the sound output section 45 is made in conjunction with the abovementioned kinesthetic sense presented by the kinesthetic sense presentation section 43, the variation of feedback control to the user can be increased.

The control value calculation block 322 of the information processing apparatus 30 calculates a control value of feedback control on the controller 40, as previously explained. More specifically, the control value calculation block 322 calculates control values of feedback control on the kinesthetic sense presentation section 43, the vibration section 44, and the sound output section 45 of the controller 40 according to the imaging mode determined by the determination block 321.

In a case where the determination block 321 determines that the image capturing is performed in the first imaging mode, the control value calculation block 322 calculates a control value of feedback control on the controller 40 on the basis of coordinate information based on the image capturing performed in the first imaging mode by the HMD unit 20. Hence, a first process based on the image capturing performed in the first imaging mode by the HMD unit 20 can be performed.

On the other hand, in a case where the determination block 321 determines that the image capturing is performed in the second imaging mode, the control value calculation block 322 calculates a control value of feedback control on the controller 40 on the basis of coordinate information based on the image capturing performed in the second imaging mode by the HMD unit 20. Hence, a second process based on the image capturing performed in the second imaging mode by the HMD unit 20 can be performed.

For the kinesthetic sense presentation section 43, the control value calculation block 322 calculates a control value that indicates what type of kinesthetic sense is to be provided under feedback control corresponding to an operation made by the user. For the vibration section 44, the control value calculation block 322 calculates a control value that indicates what type of vibration is to be provided under feedback control corresponding to an operation made by the user. For the sound output section 45, the control value calculation block 322 calculates a control value that indicates what type of sound is to be provided under feedback control corresponding to an operation made by the user. The control value calculation block 322 can calculate a control value according to a predetermined mathematical expression or a table, for example.

It is to be noted that a variety of publicly-known configurations are applicable to the abovementioned controller 40. For example, the controller 40 may include a pair of controllers that can be gripped by both hands, may include such a controller as a keyboard to which characters can be inputted, or may include an application for smartphones.

In addition, the controller 40 may be equipped with a sound input section to adopt a voice recognition technology. For example, the controller 40 may be equipped with a sound recognition section and a sound input section such as a microphone and may supply information that indicates a command or call given by the user's voice, to the information processing apparatus 30 via the communication section 41.

The display apparatus 50 includes a reception section 51 and the display section 52, as depicted in FIG. 2.

The reception section 51 receives information that indicates a display image generated by the image generation block 323 of the information processing apparatus 30, via the communication section 31.

The display section 52 is equipped with such a monitor as an LCD or an organic EL, for example, and displays the display image on the basis of the information received by the reception section 51, whereby the display image can be presented to the user.

It is to be noted that the system 1 includes two display sections, that is, the display section 27 of the HMD unit 20 and the display section 52 of the display apparatus 50. The display image may be displayed on both the display section 27 of the HMD unit 20 and the display section 52 of the display apparatus 50, or may be displayed either one of these display sections. For example, in the first imaging mode, the display image may be displayed only on the display section 27 of the HMD unit 20 since the HMD unit 20 is assumed to be worn on the user. Further, for example, in the second imaging mode, the display image may be displayed only on the display section 52 of the display apparatus 50 since the HMD unit 20 is assumed not to be worn on the user.

In addition, a variety of publicly-known configurations are applicable to the abovementioned display apparatus 50. For example, the display apparatus 50 may include the dedicated display depicted in FIGS. 1A and 1B, may include a display of a computer, or may include a display of a terminal apparatus such as a smartphone. Moreover, a touch panel for detecting a contact may be provided on a surface of the display section 52.

The control value calculation block 322 of the information processing apparatus 30 calculates a control value of feedback control to a display image to be displayed on the display section 27 of the HMD unit 20 and the display section 52 of the display apparatus 50, as previously explained. More specifically, the control value calculation block 322 calculates a control value of feedback control to the display image according to the imaging mode determined by the determination block 321.

In a case where the determination block 321 determines that the image capturing is performed in the first imaging mode, the control value calculation block 322 calculates a control value of feedback control to the display image on the basis of coordinate information based on the image capturing performed in the first imaging mode by the HMD unit 20. Hence, the first process based on the image capturing performed in the first imaging mode by the HMD unit 20 can be performed.

On the other hand, in a case where the determination block 321 determines that the image capturing is performed in the second imaging mode, the control value calculation block 322 calculates a control value of feedback control to the display image on the basis of coordinate information based on the image capturing performed in the second imaging mode by the HMD unit 20. Hence, the second process based on the image capturing performed in the second imaging mode by the HMD unit 20 can be performed.

The control value calculation block 322 calculates a control value that indicates how to change the display image under feedback control corresponding to an operation made by the user. The control value calculation block 322 calculates a control value according to a predetermined mathematical expression or a table, for example.

The image generation block 323 of the information processing apparatus 30 generates a display image to be displayed on the display section 27 of the HMD unit 20 and the display section 52 of the display apparatus 50, according to the control value calculated by the control value calculation block 322, as previously explained. More specifically, the image generation block 323 generates a new display image to be displayed on the display section 27 of the HMD unit 20 and the display section 52 of the display apparatus 50, according to the control value for changing the display image.

Figure 5:
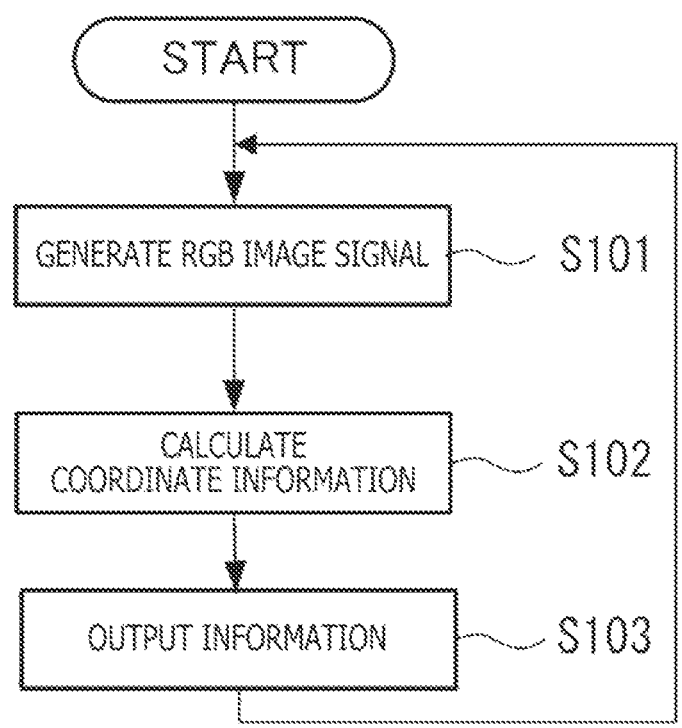
FIG. 5 is a flowchart of an exemplary processing method according to the first embodiment of the present invention.

FIG. 5 is a flowchart of exemplary processing performed by the HMD unit 20 according to the first embodiment. In the example of FIG. 5, the image sensor 211 of the RGB camera 21 generates the RGB image signal 213 (step S101).

Next, the calculation section 24 calculates coordinate information regarding the user (step S102), and the information output section 25 outputs the coordinate information and attitude information (step S103).

By repeating processing in steps S101 to S103, the HMD unit 20 can constantly supply various types of information that indicates the state of the user, to the information processing apparatus 30.

Figure 6:
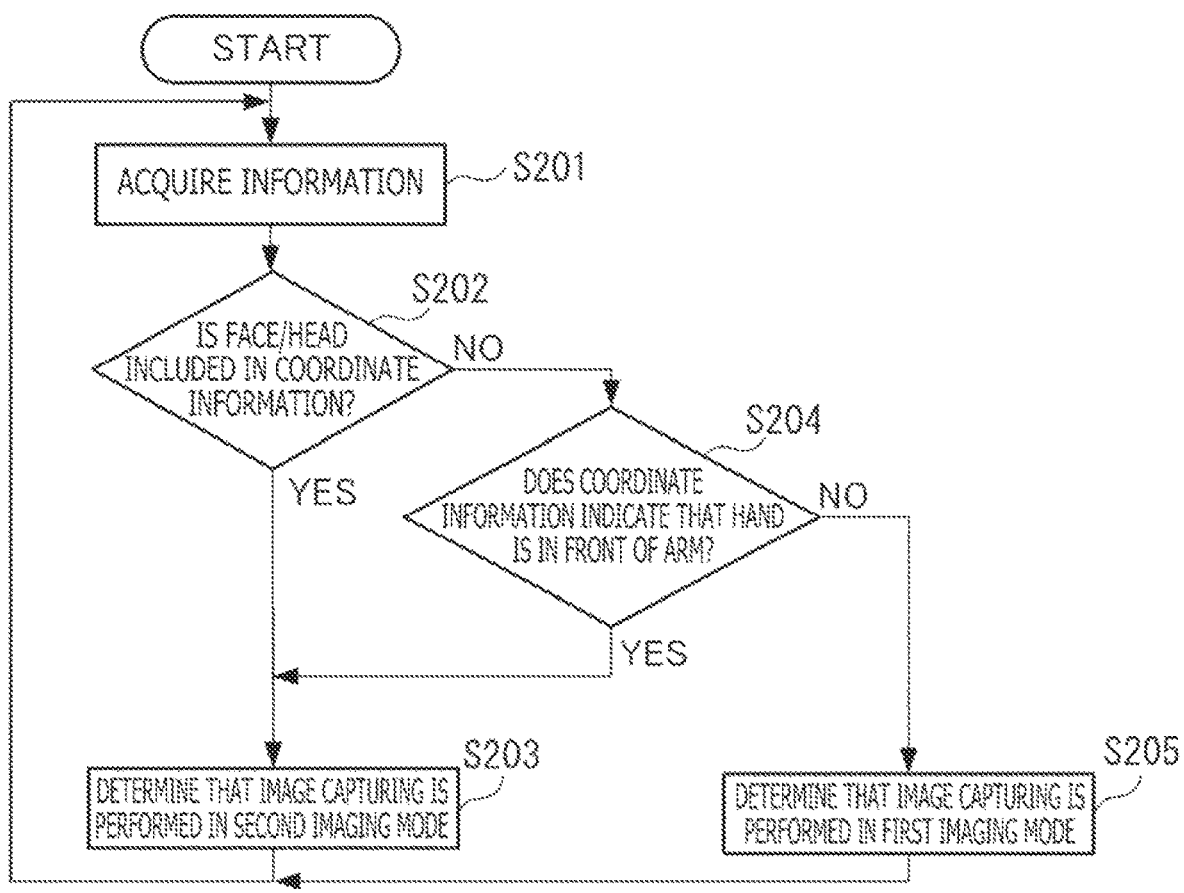
FIG. 6 is another flowchart of the exemplary processing method according to the first embodiment of the present invention.
Figure 7:
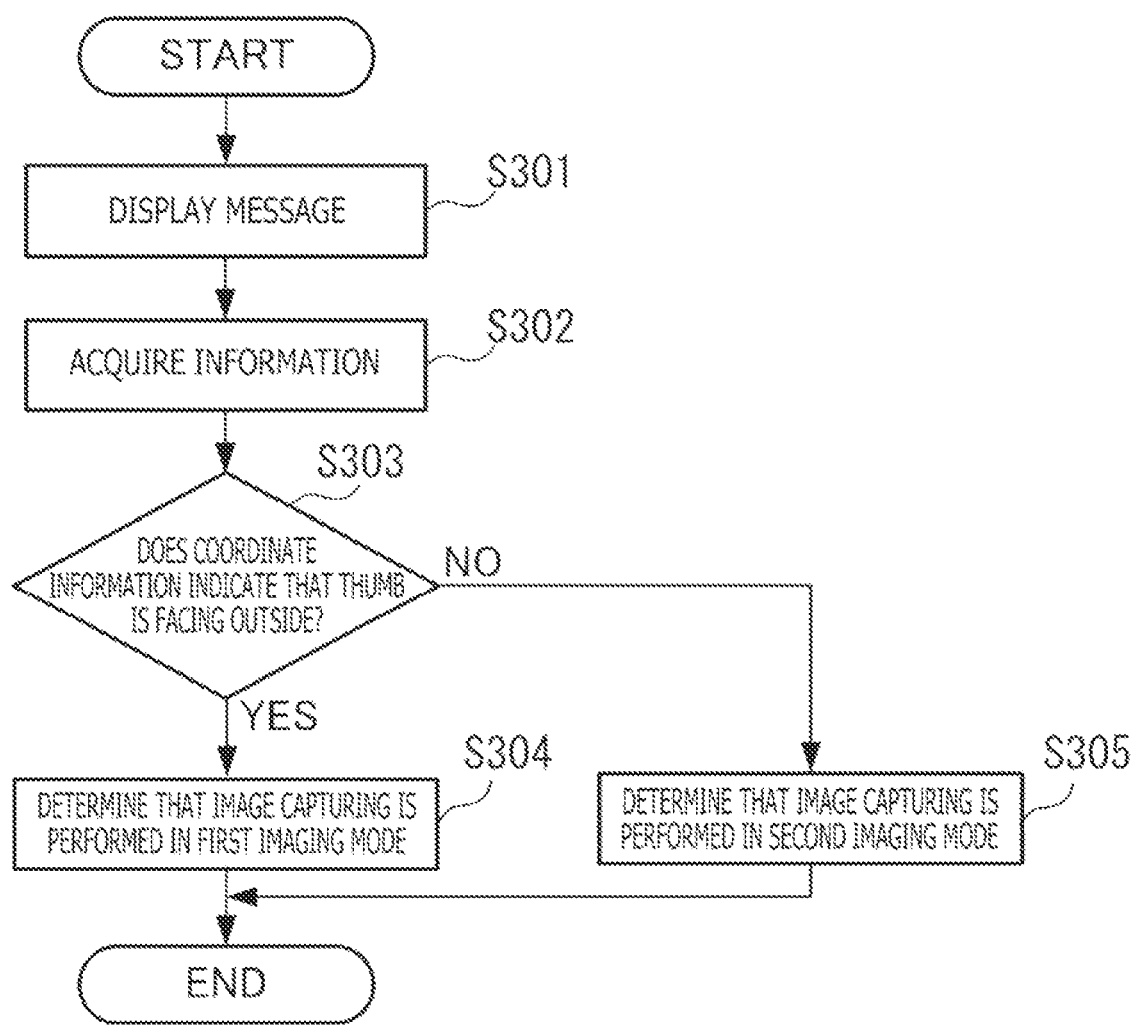
FIG. 7 is still another flowchart of the exemplary processing method according to the first embodiment of the present invention.

FIGS. 6 and 7 are flowcharts of exemplary processing performed by the information processing apparatus 30 according to the first embodiment. In the example of FIG. 6, the communication section 31 acquires various types of information supplied from the HMD unit 20 (step S201).

Next, the determination block 321 determines whether or not the user's face or head is included in the coordinate information outputted from the HMD unit 20 (step S202). In a case where the determination block 321 determines that the user's face or head is not included in the coordinate information (No in step S202), the processing proceeds to step S204 which will be explained later. In a case where the determination block 321 determines that the user's face or head is included in the coordinate information (YES in step S202), it determines that the image capturing is performed in the second imaging mode (step S203).

In a case where the determination block 321 determines that the user's face or head is not included in the coordinate information (NO in step S202), it determines whether or not the user's hand is in front of the user's arm in reference to the coordinate information outputted from the HMD unit 20 (step S204). In a case where the determination block 321 determines that the user's hand is not in front of the user's arm in reference to the coordinate information (NO in step S204), the processing proceeds to step S205 which will be explained later. In a case where the determination block 321 determines that the user's hand is in front of the user's arm in reference to the coordinate information (YES in step S204), the processing returns to step S203.

In a case where the determination block 321 determines that the user's hand is not in front of the user's arm in reference to the coordinate information (NO in step S204), it determines that the image capturing is performed in the first imaging mode (step S205).

It is to be noted that, after the imaging mode is determined in step S203 or step S205, the processing returns to step S201, and then, the control section 32 repeats the processing in the steps. Thus, the determination of the imaging mode is constantly made. In addition, in a case where a predetermined period of time has elapsed but the imaging mode has not been determined, the control section 32 may execute the following processing.

In the example of FIG. 7, the control section 32 displays such a message as to urge the user to make a particular pose, on the display section 27 of the HMD unit 20 and the display section 52 of the display apparatus 50 (step S301). For example, a message "show your both palms" is displayed here.

Next, the communication section 31 acquires various types of information supplied from the HMD unit 20 again (step S302). Subsequently, the determination block 321 determines whether or not thumbs of the user are facing outward in reference to the coordinate information outputted from the HMD unit 20 (step S303). In a case where the determination block 321 determines that the thumbs of the user are facing outward in reference to the coordinate information (YES in step S303), it determines that the image capturing is performed in the first imaging mode (step S304). In a case where the determination block 321 determines that the thumbs of the user are not facing outward in reference to the coordinate information (NO in step S303), it determines that the image capturing is performed in the second imaging mode (step S305).

Without urging the user to make a particular pose in order to make the determination as depicted in FIG. 7, an error message may be displayed on the display section 27 of the HMD unit 20 and the display section 52 of the display apparatus 50 to inform the user about the message. In addition, in a case where the determination of the imaging mode still fails even after the user is urged to make a particular pose as depicted in FIG. 7, the user may be informed of the abovementioned error message.

When the user changes the imaging mode according to the contents of the game to be played, a subject (field of view) which is an object to be imaged by the RGB camera 21 is changed. As a result, the contents of the RGB image signal 213 are changed. After the contents of the RGB image signal 213 are changed, the change is reflected in the coordinate information calculated on the basis of the RGB image signal 213. The control section 32 determines the imaging mode and then repeats the processing, as previously explained. Hence, in the system 1, the imaging mode can be determined on the basis of the coordinate information in response to the change of the imaging mode.

According to the first embodiment of the present invention explained so far, the HMD unit 20 includes the image sensor 211, which is the first image sensor, and performs image capturing in either the first imaging mode in which an image is captured from the first-person viewpoint, i.e., the user's viewpoint, or the second imaging mode in which an image of the user is captured from the third-person viewpoint with respect to the user. Further, the calculation section 24 recognizes the user on the basis of the RGB image signal 213, and calculates coordinate information regarding the user. Subsequently, the determination block 321 of the information processing apparatus 30 determines whether the image capturing is performed in the first imaging mode or the second imaging mode, on the basis of the coordinate information. In a case where the determination block 321 determines that the image capturing is performed in the first imaging mode, the control section 32 performs the first process on the basis of the coordinate information calculated in the first imaging mode. In a case where the determination block 321 determines that the image capturing is performed in the second imaging mode, the control section 32 performs the second process on the basis of the coordinate information calculated in the second imaging mode. Accordingly, a proper process can be performed without asking the user to conduct an extra operation to set the first imaging mode or the second imaging mode. This offers high convenience to the user, and the process can properly be performed according to the imaging mode.

In addition, since the HMD unit 20 according to the first embodiment can receive an operation made by the user, by calculating the coordinate information regarding the user, the HMD unit 20 does not cause the user to feel a physical fatigue unlike the conventional pointing-device-type operation apparatus that requires the user to keep a cursor position at a certain position. Moreover, the HMD unit 20 does not require the user to wear a marker or an attachment to be recognized, unlike the conventional posture-detection-type operation apparatus.

In addition, in the first embodiment, the coordinate information includes coordination information regarding at least any one of a feature point concerning the posture of the user, a feature point concerning the arm shape of the user, and a feature point concerning the hand and finger shape of the user. Consequently, the coordinate information can be calculated by obtaining a distinctive state of the user.

In addition, in the first embodiment, the calculation section 24 of the HMD unit 20 calculates, on the basis of the RGB image signal 213, coordinate information regarding at least one joint of a person who is included in an image, according to the learned model 242 that has been constructed by learning the relation between an image of a person having a plurality of joints and coordinate information indicating the positions of the joints. Consequently, the coordinate information regarding the user can be calculated properly and promptly.

In addition, in the first embodiment, the attachment part 20A that can attach the HMD unit 20 to the user's body is provided. Therefore, in a case where the HMD unit 20 is worn on the user's head through the attachment part 20A, image capturing is performed in the first imaging mode. In a case where the HMD unit 20 is not worn on the user's head through the attachment part 20A but is placed on a table or the like, image capturing is performed in the second imaging mode.

Second Embodiment

Hereinafter, a second embodiment of the present invention will be explained with reference to the drawings. In the second embodiment, only the differences from the first embodiment will be explained, and an explanation of the same features as those in the first embodiment will be omitted. In addition, a component of the second embodiment that has substantially the same function as that in the first embodiment will be denoted by the same reference sign.

Figure 8:
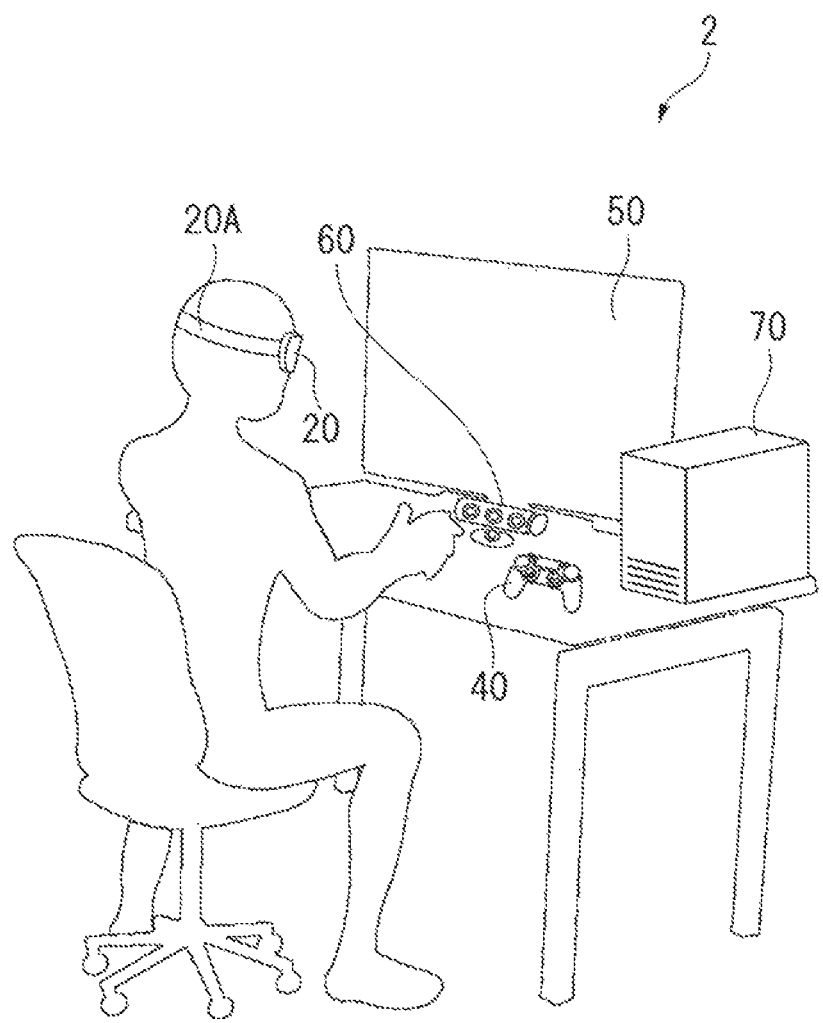
FIG. 8 is a schematic diagram depicting the entirety of a system according to a second embodiment of the present invention.
Figure 9:
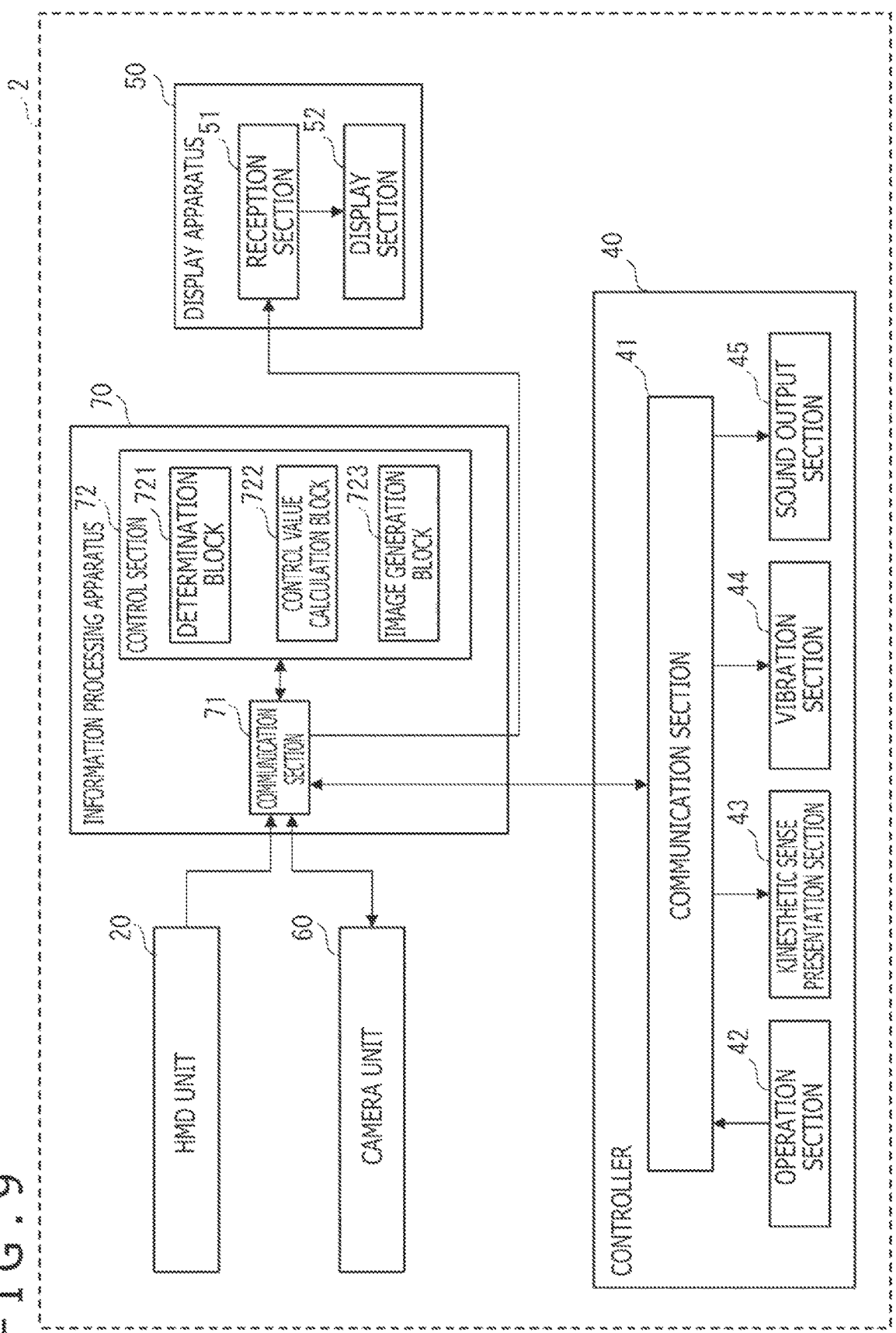
FIG. 9 is a block diagram depicting a schematic configuration of the system according to the second embodiment of the present invention.

FIG. 8 is a schematic diagram depicting the entirety of a system 2 according to the second embodiment of the present invention. FIG. 9 is a block diagram depicting a schematic configuration of the system 2.

The system 2 according to the second embodiment is a game system that includes the components of the system 1 of the first embodiment and further includes a camera unit 60 which is a second sensor apparatus as depicted in FIG. 8. In addition, the system 2 includes an information processing apparatus 70 in place of the information processing apparatus 30 in the system 1 of the first embodiment.

In the system 2 according to the second embodiment, the camera unit 60 calculates coordinate information regarding a user who is a player of a game, and transmits the coordinate information to the information processing apparatus 70, similarly to the HMD unit 20. That is, by calculating and outputting the coordinate information regarding the user, the camera unit 60 functions as an operation apparatus for receiving an operation made by the user, similarly to the HMD unit 20 and the controller 40.

The camera unit 60 is an imaging apparatus for capturing an image in the second imaging mode, which has been explained in the first embodiment. The optimal position of the camera unit 60 is the same as that of the HMD unit 20 capturing an image in the second imaging mode in the first embodiment.

FIG. 10 is a block diagram depicting a schematic configuration of the camera unit 60.

The camera unit 60 includes an RGB camera 61, an IMU 63, a calculation section 64 which functions as the first computation processing device, and an information output section 65. The configurations of the RGB camera 61, the IMU 63, the calculation section 64, and the information output section 65 are similar to those of the RGB camera 21, the IMU 23, the calculation section 24, and the information output section 25 of the HMD unit 20 of the first embodiment.

Further, the RGB camera 61 generates an RGB image signal 613 by means of an image sensor 611 and a processing circuit 612 that have similar configurations to the image sensor 211 and the processing circuit 212 of the RGB camera 21 of the first embodiment.

The calculation section 64 calculates the coordinate information regarding the user, on the basis of the RGB image signal 613 generated by the RGB camera 61, by means of a coordinate calculation block 641 and a learned model 642 that have similar configurations to the coordinate calculation block 241 and the learned model 242 of the calculation section 24 of the first embodiment.

The information output section 65 outputs the coordinate information regarding the user which is calculated by the calculation section 64 and attitude information obtained by the IMU 63 to the information processing apparatus 70.

As described so far, the camera unit 60 performs processing from generation of the RGB image signal 613 to calculation of the coordination information regarding the user, alone, as in the HMD unit 20 of the first embodiment, and can output the calculated coordinate information and the attitude information to the information processing apparatus 70 without outputting the RGB image signal 613. It is to be noted that the camera unit 60 preferably has an independent power source.

Which of the camera unit 60 and the HMD unit 20 is to be used depends on a purpose such as the contents of the game to be played.

Figure 11A:
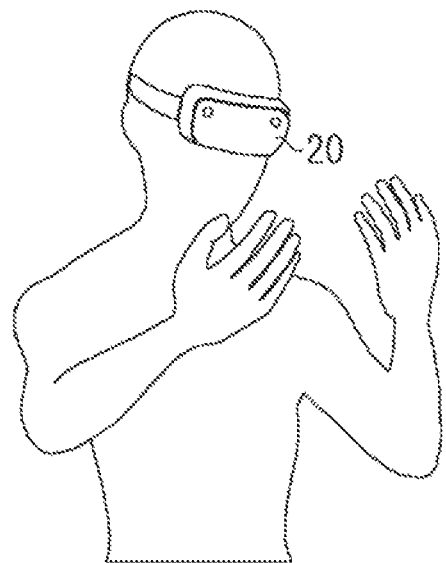
FIG. 11A is a diagram for explaining an imaging mode in the second embodiment of the present invention.
Figure 11B:
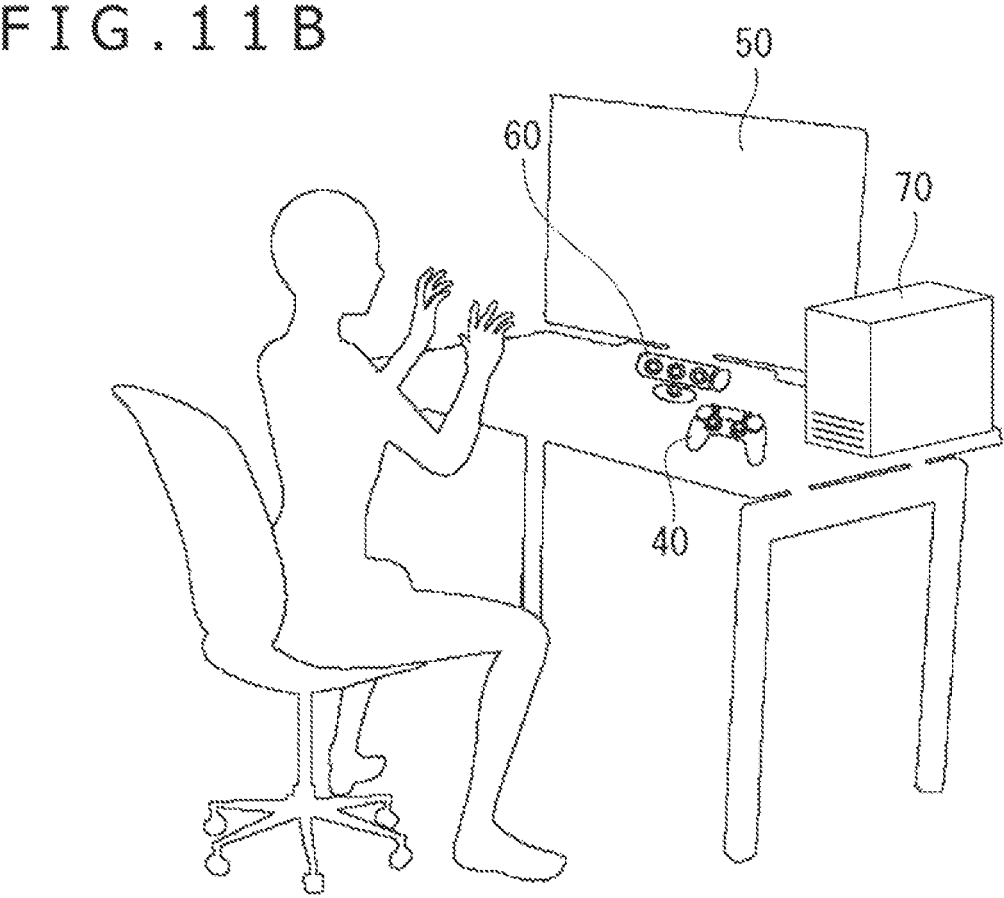
FIG. 11B is another diagram for explaining the imaging mode in the second embodiment of the present invention.

FIGS. 11A and 11B are diagrams for explaining imaging modes in the second embodiment. In the system 2 according to the second embodiment, the HMD unit 20 performs image capturing in the first imaging mode, and the camera unit 60 performs image capturing in the second imaging mode.

In the first imaging mode, the HMD unit 20 worn on the user's head as depicted in FIG. 11A performs image capturing. On the other hand, in the second imaging mode, the camera unit 60 placed on a table or the like as depicted in FIG. 11B performs image capturing.

Hence, in the second embodiment, a subject included in image data based on the generated image signal differs between the first imaging mode and the second imaging mode, as in the first embodiment.

Referring back to FIG. 9, the information processing apparatus 70 includes a communication section 71 and a control section 72 in place of the communication section 31 and the control section 32 of the information processing apparatus 30 of the first embodiment.

The communication section 71 receives the coordinate information regarding the user and the attitude information that are outputted from the information output section 65 of the camera unit 60, as well as the coordinate information regarding the user and the attitude information that are outputted from the information output section 25 of the HMD unit 20, and outputs a display image to be displayed on the display section 27 of the HMD unit 20. It is to be noted hereinbelow that, in order to distinguish these pieces of coordinate information from each other, the coordinate information regarding the user that is outputted from the information output section 25 of the HMD unit 20 is referred to as coordinate information $C_{20}$, while the coordinate information regarding the user that is outputted from the information output section 65 of the camera unit 60 is referred to as coordinate information $C_{60}$.

The control section 72 includes a function of a determination block 721, a function of a control value calculation block 722, and a function of an image generation block 723, in place of the determination block 321, the control value calculation block 322, and the image generation block 323 of the control section 32 of the information processing apparatus 30 of the first embodiment.

The determination block 721 determines whether image capturing is performed in the first imaging mode or the second imaging mode, on the basis of the coordinate information $C_{20}$ outputted from the HMD unit 20 or the coordinate information $C_{60}$ outputted from the camera unit 60. The determination block 721 makes the determination as in the information processing apparatus 30 of the first embodiment.

The control value calculation block 722 calculates a control value of feedback control on external apparatuses including the HMD unit 20, the controller 40, and the display apparatus 50, according to the imaging mode determined by the determination block 721. The HMD unit 20, the controller 40, and the camera unit 60 each function as an operation apparatus for receiving an operation made by the user, as previously explained. As such, according to an operation made by the user through any one of the HMD unit 20, the controller 40, and the camera unit 60, the control value calculation block 722 calculates a control value of feedback control on external apparatuses including the HMD unit 20, the controller 40, and the display apparatus 50. The control value calculation block 722 calculates the control value as in the information processing apparatus 30 of the first embodiment. Then, the calculated control value is outputted to the controller 40 via the communication section 71.

The image generation block 723 generates a display image that indicates the state of the user, according to the imaging mode determined by the determination block 721. The image generation block 723 generates the display image as in the information processing apparatus 30 of the first embodiment.

The controller 40 has similar configuration and function to those in the first embodiment.

The control value calculation block 722 of the information processing apparatus 70 calculates a control value of feedback control on the controller 40, as previously explained. In a case where the determination block 721 determines that the image capturing is performed in the first imaging mode, the control value calculation block 722 calculates the control value of feedback control on the controller 40 on the basis of the coordinate information $C_{20}$ outputted from the HMD unit 20. Since the coordinate information $C_{20}$ outputted from the HMD unit 20 is used to calculate the control value, the first process based on the first imaging mode in which the HMD unit 20 serves as the operation apparatus can be performed.

On the other hand, in a case where the determination block 721 determines that the image capturing is performed in the second imaging mode, the control value calculation block 722 calculates a control value of feedback control on the controller 40 on the basis of the coordinate information $C_{60}$ outputted from the camera unit 60. Since the coordinate information $C_{60}$ outputted from the camera unit 60 is used to calculate the control value, the second process based on the second imaging mode in which the camera unit 60 serves as the operation apparatus can be performed.

The display apparatus 50 has similar configurations and functions to those in the first embodiment.

The control value calculation block 722 of the information processing apparatus 70 calculates a control value of feedback control to a display image to be displayed on the display section 27 of the HMD unit 20 and the display section 52 of the display apparatus 50, as previously explained. In a case where the determination block 721 determines that the image capturing is performed in the first imaging mode, the control value calculation block 722 calculates the control value of feedback control to the display image on the basis of the coordinate information $C_{20}$ outputted from the HMD unit 20. Since the coordinate information $C_{20}$ outputted from the HMD unit 20 is used to calculate the control value, the process based on the first imaging mode in which the HMD unit 20 serves as the operation apparatus can be performed.

On the other hand, in a case where the determination block 721 determines that the image capturing is performed in the second imaging mode, the control value calculation block 722 calculates a control value of feedback control to the display image on the basis of the coordinate information $C_{60}$ outputted from the camera unit 60. Since the coordinate information $C_{60}$ outputted from the camera unit 60 is used to calculate the control value, the process based on the second imaging mode in which the camera unit 60 serves as the operation apparatus can be performed.

Figure 12:
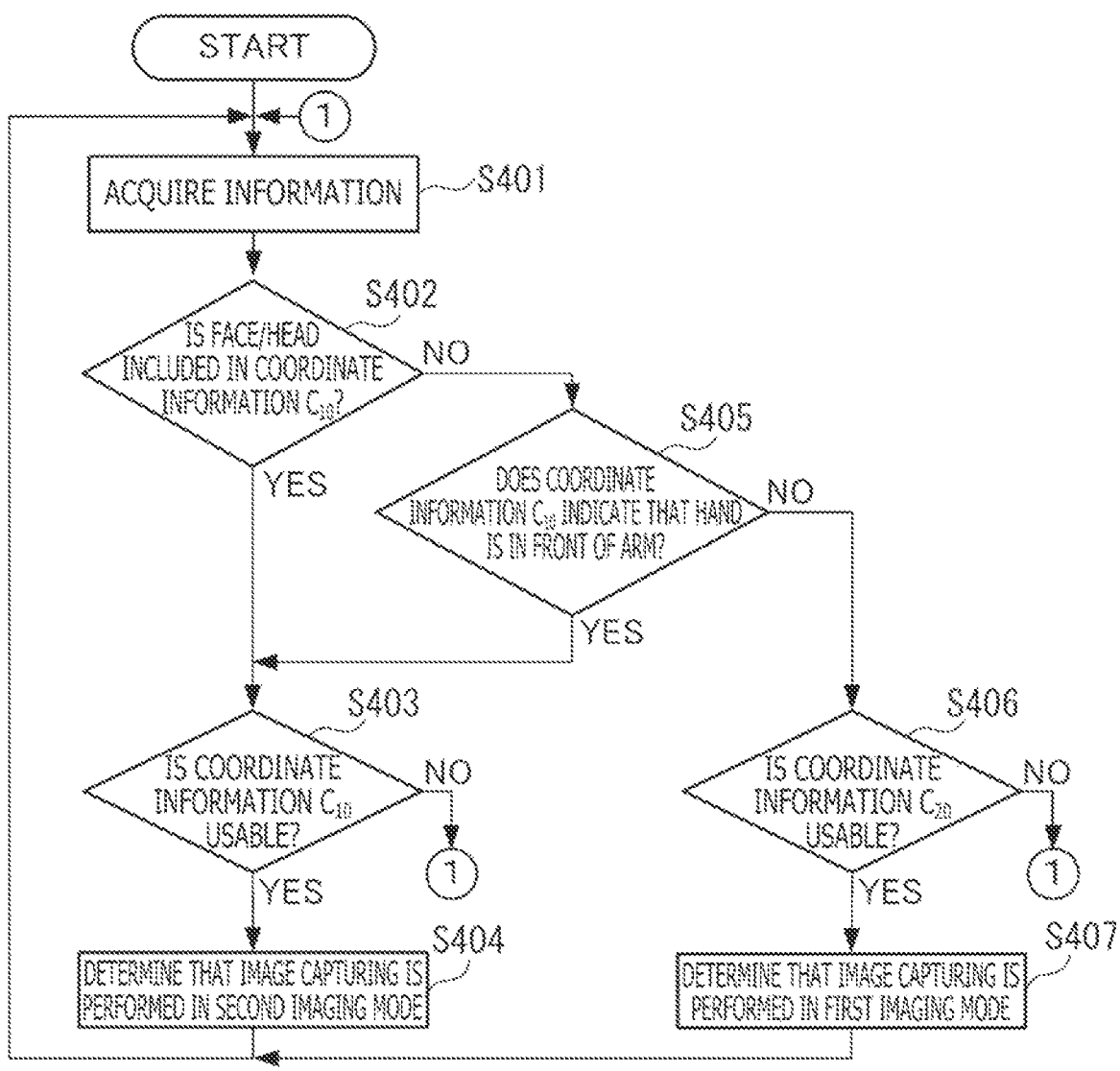
FIG. 12 is a flowchart of an exemplary processing method according to the second embodiment of the present invention.

FIG. 12 is a flowchart of exemplary processing performed by the information processing apparatus 70 according to the second embodiment. In the example of FIG. 12, the communication section 71 acquires various types of information supplied from the HMD unit 20 and the camera unit 60 (step S401).

The determination block 721 determines whether or not the user's face or head is included in the coordinate information $C_{60}$ outputted from the camera unit 60 (step S402). In a case where the determination block 721 determines that the user's face or head is not included in the coordinate information $C_{60}$ (NO in step S402), the processing proceeds to step S405 which will be explained later. In a case where the determination block 721 determines that the user's face or head is included in the coordinate information $C_{60}$ (YES in step S402), it determines whether or not the coordinate information $C_{60}$ outputted from the camera unit 60 is usable (step S403). Whether or not the coordinate information $C_{60}$ is usable can be determined on the basis of whether or not a control value can be calculated according to the coordinate information $C_{60}$, for example. In a case where the determination block 721 determines that the coordinate information $C_{60}$ is usable (YES in step S403), it determines that the image capturing is performed in the second imaging mode (step S404). On the other hand, in a case where the determination block 721 determines that the coordinate information $C_{60}$ is not usable (NO in step S403), it cannot determine the imaging mode. Thus, the processing returns to step S401.

In a case where the determination block 721 determines that the user's face or head is not included in the coordinate information $C_{60}$ (NO in step S402), it determines whether or not the user's hand is in front of the user's arm in reference to the coordinate information $C_{60}$ outputted from the camera unit 60 (step S405). In a case where the determination block 721 determines that the user's hand is not in front of the user's arm in reference to the coordinate information $C_{60}$ (NO in step S405), the processing proceeds to step S406 which will be explained later. In a case where the determination block 721 determines that the user's hand is in front of the user's arm in reference to the coordinate information $C_{60}$ (YES in step S405), the processing returns to step S403.

In a case where the determination block 721 determines that the user's hand is not in front of the user's arm in reference to the coordinate information $C_{60}$ (NO in step S405), it determines whether or not the coordinate information $C_{20}$ outputted from the HMD unit 20 is usable (step S406). Whether or not the coordinate information $C_{20}$ is usable can be determined on the basis of whether or not a control value can be calculated according to the coordinate information $C_{20}$. In a case where the determination block 721 determines that the coordinate information $C_{20}$ is usable (YES in step S406), it determines that the image capturing is performed in the first imaging mode (step S407). On the other hand, in a case where the determination block 721 determines that the coordinate information $C_{20}$ is not usable (NO in step S406), the processing returns to step S401 because the determination block 721 cannot determine the imaging mode.

It is to be noted that, after the imaging mode is determined in step S404 or step S407, the processing returns to step S401, and the control section 72 repeats the processing in the steps. Accordingly, the determination of the imaging mode is constantly made. In addition, in a case where a predetermined period of time has elapsed but the determination of the imaging mode has not been made, the control section 72 may urge the user to make a particular pose in order to make the determination, as in the control section 32 according to the first embodiment, or may inform the user of an error message by displaying the error message on the display section 27 of the HMD unit 20 and the display section 52 of the display apparatus 50, for example. Alternatively, in a case where the control section 72 urges the user to make a particular pose in order to determine the imaging mode but the determination still fails, the user may be informed of the abovementioned error message.

For example, in a case where the user is urged to make a "pose of showing the palms of both hands," the determination block 721 can determine the imaging mode by at least either determining whether or not the user's thumbs are facing outward in reference to the coordinate information $C_{20}$ outputted from the HMD unit 20 or determining whether or not the user's thumbs are facing inward in reference to the coordinate information $C_{60}$ outputted from the camera unit 60.

According to the second embodiment of the present invention explained so far, the system 2 includes the HMD unit 20, which is the first imaging apparatus, that performs image capturing in the first imaging mode and the camera unit 60, which is a second imaging apparatus, that performs image capturing in the second imaging mode, and the determination block 721 determines whether the HMD unit 20 or the camera unit 60 is capturing an image. In a case where it is determined that the HMD unit 20 is capturing an image, the control section 72 performs the first process on the basis of the coordinate information $C_{20}$ outputted from the HMD unit 20. In a case where it is determined that the camera unit 60 is capturing an image, the control section 72 performs the second process on the basis of the coordinate information $C_{60}$ outputted from the camera unit 60. Accordingly, in a case where both the HMD unit 20 and the camera unit 60 are used, the same effect as that of the first embodiment can be provided.

In addition, the camera unit 60 according to the second embodiment performs processing from generation of the RGB image signal 613 to calculation of the coordinate information regarding the user, by itself, and outputs the coordinate information and the attitude information obtained by the image sensor 611, without outputting the RGB image signal 613. Accordingly, adverse effects of a communication load and a communication delay can be reduced. Moreover, since it is not necessary to output the RGB image signal 613, the second embodiment is useful in view of privacy protection.

Third Embodiment

Hereinafter, a third embodiment of the present invention will be explained with reference to the drawings. In the third embodiment, only the differences from the first embodiment will be explained, and an explanation of the same features as those in the first embodiment will be omitted. In addition, a component of the third embodiment that has substantially the same function as that in the first embodiment will be denoted by the same reference sign.

A system 3 according to the third embodiment is a game system that includes the information processing apparatus 30, the controller 40, and the display apparatus 50, which are not illustrated, as in the system 1 of the first embodiment, and further includes an HMD unit 80 in place of the HMD unit 20 of the system 1.

Figure 13:
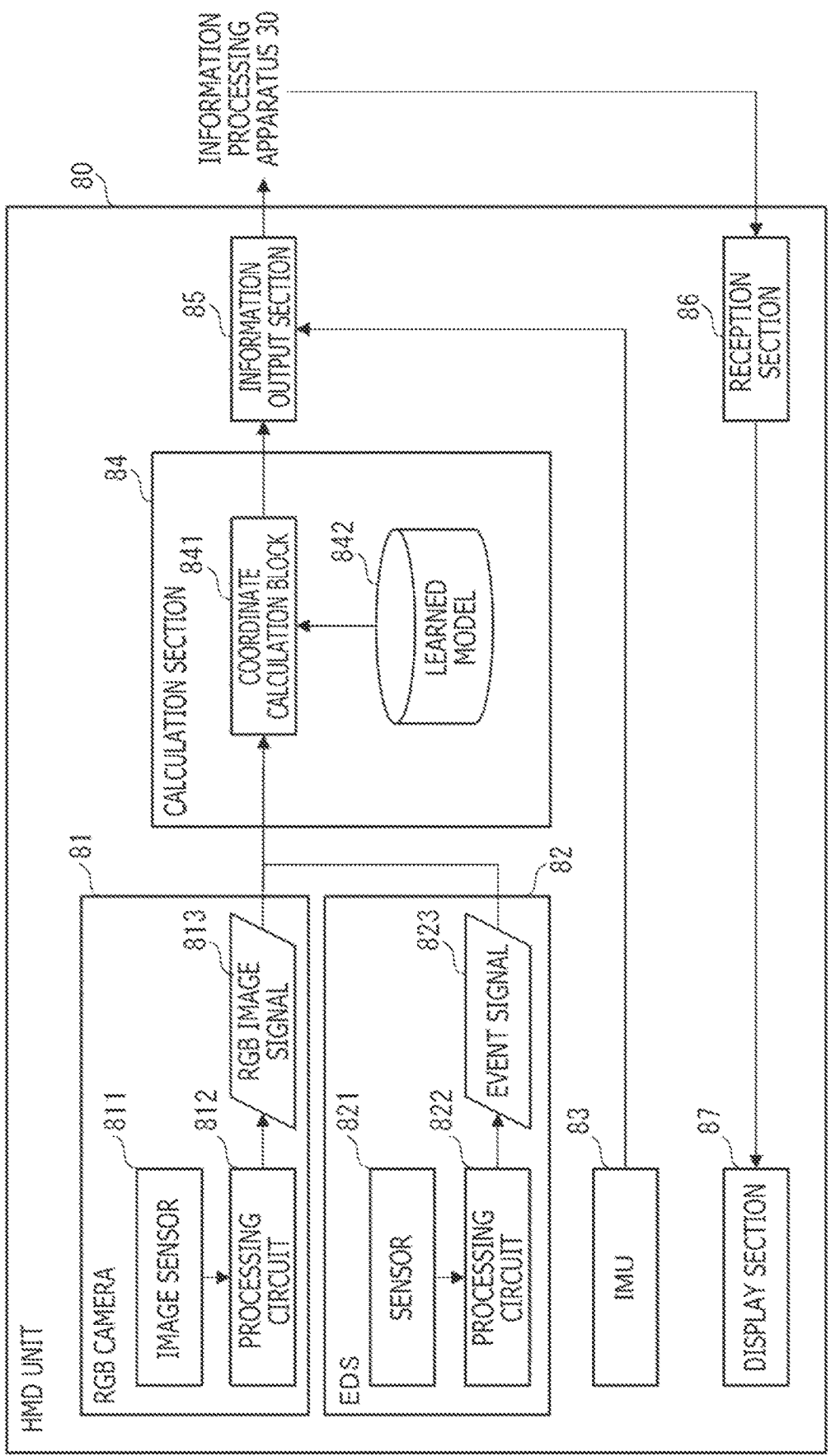
FIG. 13 is a block diagram depicting a schematic configuration of an HMD unit in a system according to a third embodiment of the present invention.

FIG. 13 is a block diagram depicting a schematic configuration of the HMD unit 80 of the system 3.

Similarly to the HMD unit 20 of the system 1 of the first embodiment, the HMD unit 80 includes an RGB camera 81, an IMU 83, a calculation section 84 which functions as the first computation processing device, an information output section 85, a reception section 86, and a display section 87, and further includes an EDS (Event Driven Sensor) 82 which is a second imaging device. The configurations of the RGB camera 81, the IMU 83, the calculation section 84, the information output section 85, the reception section 86, and the display section 87, are similar to those of the RGB camera 21, the IMU 23, the calculation section 24, the information output section 25, the reception section 26, and the display section 27 of the HMD unit 20 of the first embodiment.

By means of an image sensor 811 and a processing circuit 812 which have similar configurations to the image sensor 211 and the processing circuit 212 of the RGB camera 21, the RGB camera 81 generates an RGB image signal 813.

The EDS 82 includes a sensor 821 which is a second image sensor and constitutes a sensor array, and a processing circuit 822 which is connected to the sensor 821. The sensor 821 is an event drive type vison sensor that includes a light reception element and that generates an event signal 823, which is a second image signal, when an intensity change of incident light on each pixel is detected, or more specifically, when a brightness change that is greater than a predetermined value is detected. The event signal 823 outputted through the processing circuit 822 includes identification information (e.g., pixel position) regarding the sensor 821, the polarity (increase or decrease) of the brightness change, and a timestamp. In addition, when a brightness change is detected, the EDS 82 can generate the event signal 823 at a frequency that is much higher than the frequency of generating the RGB image signal 813 (the frame rate of the RGB camera 81).

It is to be noted that, as previously explained, the signal from which an image can be created is referred to as an image signal herein. Therefore, the RGB image signal 813 and the event signal 823 are examples of image signals.

In the third embodiment, a timestamp that is given to the RGB image signal 813 is synchronized with a timestamp that is given to the event signal 823. Specifically, time information that is used by the EDS 82 to generate a timestamp is provided to the RGB camera 81, for example, so that the timestamp that is given to the RGB image signal 813 can be synchronized with the timestamp that is given to the event signal 823. Alternatively, in a case where time information that is used by the RGB camera 81 to generate a timestamp is independent of time information that is used by the EDS 82 to generate a timestamp, an offset amount of the timestamps is calculated with reference to the time at which a particular event (e.g., a change of a subject throughout an image) occurs, so that the timestamp that is given to the RGB image signal 813 and the timestamp that is given to the event signal 823 can be synchronized with each other afterwards.

In addition, in the third embodiment, as a result of calibration procedures previously executed between the RGB camera 81 and the EDS 82, the sensor 821 of the EDS 82 correlates to one or more pixels of the RGB image signal 813, so that the event signal 823 is generated according to a light intensity change in the one or more pixels of the RGB image signal 813. More specifically, an image of a calibration pattern common to the RGB camera 81 and the EDS 82 is captured, and a camera-sensor correlation parameter is calculated from respective internal parameters and external parameters of the RGB camera 81 and the EDS 82, for example. Accordingly, the sensor 821 can correlate to the one or more pixels of the RGB image signal 813.

The IMU 83 is an inertial sensor that detects the attitude of the image sensor 811 and the attitude of the sensor 821. The IMU 83 acquires three-dimensional attitude information regarding the image sensor 811 and the sensor 821 in a predetermined cycle or at a predetermined timing, and outputs the attitude information to the information output section 85.

The calculation section 84 includes a coordinate calculation block 841 and a learned model 842. The calculation section 84 calculates the coordinate information regarding the user on the basis of the event signal 823 generated by the EDS 82 and the RGB image signal 813 generated by the RGB camera 81.

The coordinate calculation block 841 of the calculation section 84 detects, in the event signal 823, an object that is present in the region of continuous pixels indicating that events having the same polarity occur, for example, and performs subject recognition on the basis of the corresponding part in the RGB image signal 813, whereby the user is recognized. In a case where a plurality of users are included in the field of view of the camera unit 60, the coordinate calculation block 841 identifies each of the users.

Then, the coordinate calculation block 841 calculates coordinate information that indicates the positions of a plurality of joints of each of the recognized users, from the RGB image signal 813 on the basis of the learned model 842. The positions of a plurality of joints of each user correspond to a feature point concerning the posture of the user, a feature point concerning the arm shape of the user, and a feature point concerning the hand and finger shape of the user.

Since the learned model 842 is similar to that in the first embodiment, an explanation thereof will be omitted.

The information output section 85 outputs the coordinate information regarding the user which is calculated by the calculation section 84 and the attitude information obtained by the IMU 83 to the information processing apparatus 30.

The configurations of the reception section 86 and the display section 87 are similar to those of the reception section 26 and the display section 27 of the HMD unit 20 of the first embodiment.

As explained so far, the HMD unit 80 performs processing from generation of the RGB image signal 813 and the event signal 823 to calculation of the coordinate information regarding the user, alone, as in the HMD unit 20 of the first embodiment. The HMD unit 80 can output the calculated coordinate information and the attitude information to the information processing apparatus 30 without outputting the RGB image signal 813 and the event signal 823. It is to be noted that, similarly to the HMD unit 20 according to the first embodiment, the HMD unit 80 preferably has an independent power source.

The configurations and functions of the information processing apparatus 30, the controller 40, and the display apparatus 50 are similar to those in the first embodiment.

Figure 14:
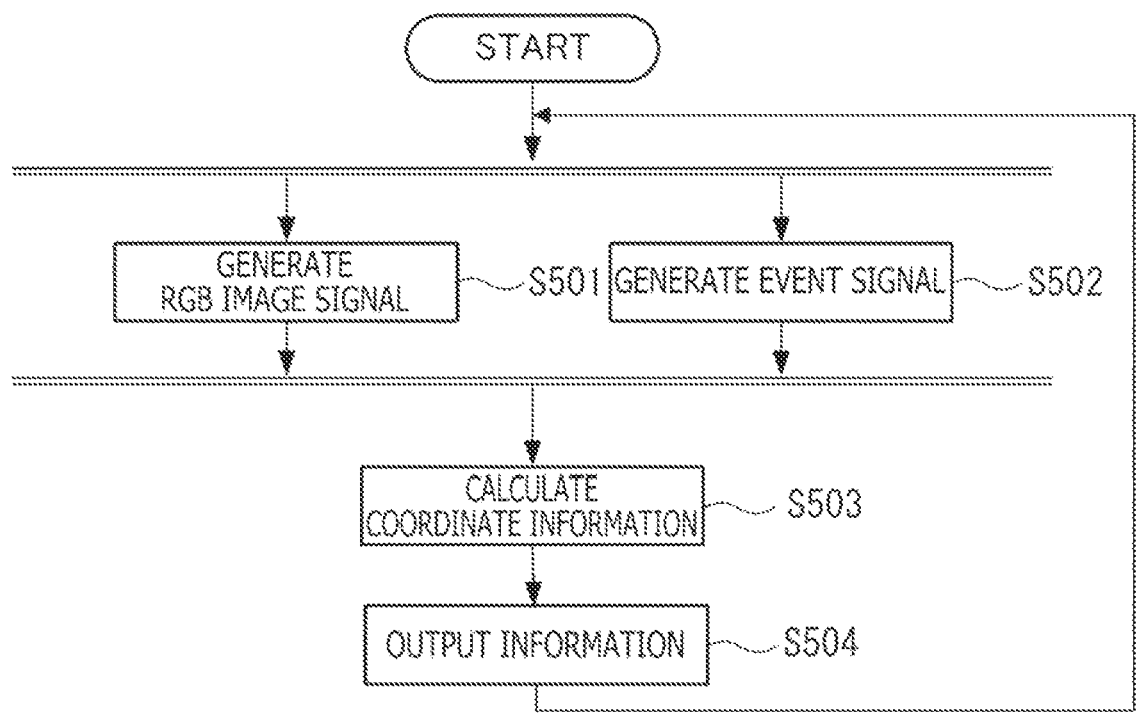
FIG. 14 is a flowchart of an exemplary processing method according to the third embodiment of the present invention.

FIG. 14 is a flowchart of exemplary processing performed by the HMD unit 80 according to the third embodiment. In the example of FIG. 14, the image sensor 811 of the RGB camera 81 generates the RGB image signal 813 (step S501), and further, the sensor 821 of the EDS 82 generates the event signal 823 (step S502).

Next, the calculation section 84 calculates coordinate information regarding a user (step S503), and the information output section 85 outputs the coordinate information and attitude information (step S504).

By repeating processing in steps S501 to S504, the HMD unit 80 can constantly supply various types of information that indicates the state of the user, to the information processing apparatus 30.

Since the processing performed by the information processing apparatus 30 is similar to that in the first embodiment, a flowchart and an explanation thereof will be omitted.

In the third embodiment having been explained so far, the HMD unit 80 calculates the coordinate information regarding the user on the basis of the RGB image signal 813 and the event signal 823 respectively generated by the image sensor 811 and the sensor 821, and outputs the coordinate information to the information processing apparatus 30. Hence, as in the first embodiment, a proper process can be performed without asking the user to perform an extra operation to set the first imaging mode or the second imaging mode. This offers high convenience to the user, and a process can properly be performed according to the imaging mode. Moreover, since the sensor 821 that generates the event signal 823 is used, a process can properly be performed according to the imaging mode while the latency is suppressed.

It is to be noted that, in the third embodiment, the system 3 that includes the HMD unit 80 having the EDS 82 as well as the RGB camera 81, in place of the HMD unit 20 in the system 1 of the first embodiment, has been explained as an example. However, the system 3 may have a configuration including an HMD unit having an EDS as well as an RGB camera, in place of the HMD unit 20 in the system 2 of the second embodiment. In addition, the system 3 may have a configuration including a camera unit having an EDS as well as an RGB camera, in place of the camera unit 60 in the system 2 of the second embodiment. In either case, since a sensor that generates an event signal is used, a process can properly be performed according to the imaging mode while the latency is suppressed.

Fourth Embodiment

Hereinafter, a fourth embodiment of the present invention will be explained with reference to the drawings. In the fourth embodiment, only the differences from the first embodiment will be explained, and an explanation of the same features as those in the first embodiment will be omitted. In addition, a component of the fourth embodiment that has substantially the same function as that in the first embodiment will be denoted by the same reference sign.

FIG. 15 is a block diagram depicting a schematic configuration of a system 4 according to the fourth embodiment.

The system 4 according to the fourth embodiment is a game system that includes a server 90 and a terminal apparatus 100 in place of the information processing apparatus 30 in the system 1 of the first embodiment, as depicted in FIG. 15.

The server 90 (e.g., a cloud server) is communicably connected with the HMD unit 20 and the terminal apparatus 100 via the internet communication network or radio waves. The server 90 has the same configuration as the information processing apparatus 30 of the first embodiment, and performs a variety of processing based on information outputted from the HMD unit 20. Moreover, the terminal apparatus 100 includes a communication section 101. The communication section 101 receives information outputted from the server 90. In addition, similarly to the communication section 31 of the information processing apparatus 30 of the first embodiment, the communication section 101 is capable of mutually communicating with the controller 40, and outputs an image to be displayed on the HMD unit 20 and the display apparatus 50.

With such a configuration, the HMD unit 20 performs processing from generation of the RGB image signal 213 to calculation of the coordinate information, and outputs only the coordinate information to the server 90. Accordingly, even with a game system using a server such as a cloud server, the same effect can be obtained.

If a server is used in the system 2 which has been explained in the second embodiment or the system 3 which has been explained in the third embodiment, the same effect can also be obtained.

It is to be noted that part of the processing that is performed by the information processing apparatus of each of the embodiments may be performed by the HMD unit and the camera unit. For example, the HMD unit 20 may have the function of the determination block 321 of the information processing apparatus 30 of the first embodiment. In addition, the HMD unit 20 and the camera unit 60 may have the function of the determination block 721 of the information processing apparatus 70 of the second embodiment, for example. In either case, the HMD unit 20 and the camera unit 60 may change the method for calculating the coordinate information, or more specifically, may change the learned model according to the determined imaging mode.

In addition, in the HMD unit of each of the abovementioned embodiments, the numbers of the RGB cameras may be equal to or may be different from the number of the EDSs. Further, the number of the RGB cameras and the number of the EDSs may each be one, or be two or more. For example, in a case where two or more of the RGB cameras are provided, the range of the field of view for generating RGB image signals can be expanded, or the state of a person can three-dimensionally be predicted from a plurality of RGB image signals. Further, for example, in a case where a plurality of the EDSs 12 are provided, the range of the field of view for generating event signals can be expanded, or the motion amount of a person can three-dimensionally be calculated from a plurality of the event signals. The same applies to the RGB cameras and the EDSs of the camera unit.

In addition, the HMD unit and the camera unit that have been explained in each of the abovementioned embodiments may be installed in a single apparatus, or may be installed in a plurality of apparatuses in a distributed manner. For example, at least some of the sensors of the units are independently provided while the other configurations may be implemented as the HMD unit main body and the camera unit main body.

Some of the embodiments of the present invention have been explained above with reference to the attached drawings, but the present invention is not limited to these embodiments. It is clear that a person ordinarily skilled in the technical field of the present invention can conceive of various changes and modifications within the technical scope set forth in the claims. Such changes and modifications are also naturally considered to belong to the technical scope of the present invention.

REFERENCE SIGNS LIST 1, 2, 3, 4: System
20, 80: HMD unit
21, 61, 81: RGB camera
23, 63, 83: IMU
24, 64, 84: Calculation section
25, 65, 85: Information output section
26, 51, 86: Reception section
27, 52, 87: Display section
30, 70: Information processing apparatus
31, 41, 71, 101: Communication section
32, 72: Control section
40: Controller
42: Operation section
43: Kinesthetic sense presentation section
44: Vibration section
45: Sound output section
50: Display apparatus
60: Camera unit
82: EDS
90: Server
100: Terminal apparatus
211, 611, 811: Image sensor
212, 612, 812, 822: Processing circuit
213, 613, 813: RGB image signal
241, 641, 841: Coordinate calculation block
242, 642, 842: Learned model
321, 721: Determination block
322, 722: Control value calculation block
323, 723: Image generation block
821: Sensor
823: Event signal

The invention claimed is:

1. A system comprising:
a first image sensor for generating a first image signal by synchronously scanning all pixels at a predetermined timing; and
one or more processors to:
recognize the user on a basis of the first image signal;
calculate coordinate information regarding the user on the basis of the first image signal;
determine whether image capturing using the first image sensor is performed in a first imaging mode in which an image is captured from a first-person viewpoint corresponding to the user's viewpoint, or a second imaging mode in which the image of the user is captured from a third-person viewpoint with respect to the user, on a basis of the coordinate information; and perform, in a case where it is determined that the image capturing is performed in the first imaging mode, a first process on a basis of the coordinate information calculated in the first imaging mode and that performs, in a case where it is determined that the image capturing is performed in the second imaging mode, a second process on a basis of the coordinate information calculated in the second imaging mode.

2. The system according to claim 1, wherein the coordinate information includes coordinate information regarding at least any one of a feature point concerning a posture of the user, a feature point concerning an arm shape of the user, and a feature point concerning a hand and finger shape of the user.

3. The system according to claim 2, wherein calculating the coordinate information comprises using, as the feature point, at least one joint of the user, on a basis of a learned model that is constructed by learning a relation between an image of a person having a plurality of joints and coordinate information indicating positions of the plurality of joints.

4. The system according to claim 1, further comprising a head mounted display, the head mounted display comprising the first image sensor and an attachment part that is able to arrange at least the head mounted display on a body of the user is provided.

5. The system according to claim 4, wherein the attachment part is able to arrange head mounted display on a head of the user.

6. The system according to claim 4, further comprising: a sensor apparatus for outputting the coordinate information.

7. The system according to claim 1, wherein the one or more processors further to:
determine whether a first imaging apparatus performs the imaging capturing using the first image sensor or a second imaging apparatus performs the image capturing using the first image sensor, and
in a case where it is determined that the first imaging apparatus is performing the image capturing, perform the first process on a basis of the coordinate information calculated according to the first image signal generated by the first imaging apparatus, and in a case where it is determined that the second imaging apparatus is performing the image capturing, perform the second process on a basis of the coordinate information calculated according to the first image signal generated by the second imaging apparatus.

8. The system according to claim 1, wherein the first imaging apparatus comprises a head mounted display, the head mounted display comprising the first image sensor and an attachment part for arranging at least the first imaging apparatus on a body of the user is provided.

9. The system according to claim 1, wherein the first imaging apparatus comprises a head mounted display, the head mounted display comprising the first image sensor and an attachment part for arranging the first imaging apparatus on a head of the user.

10. The system according to claim 1, further comprising:
a second image sensor comprising an event drive type vison sensor that asynchronously generates a second image signal when an intensity change of incident light on each pixel is detected, and the one or more processors further to:
perform at least either recognition of the user or calculation of the coordinate information, on a basis of the first image signal and the second image signal.

11. An imaging apparatus comprising:
a first image sensor for generating a first image signal by synchronously scanning all pixels at a predetermined timing;
one or more processors to:
recognize a user on a basis of a first image signal, whether the first image signal represents an image captured from a first-person viewpoint corresponding to the user's viewpoint, or represents the image captured from a third-person viewpoint with respect to the user, on a basis of the coordinate information;
calculate coordinate information on a basis of the first image signal; and
output the coordinate information.

12. The imaging apparatus according to claim 11, wherein the coordinate information includes coordinate information regarding at least any one of a feature point concerning a posture of the user, a feature point concerning an arm shape of the user, and a feature point concerning a hand and finger shape of the user.

13. The imaging apparatus according to claim 12, wherein calculating the coordinate information including, as the feature point, comprises using at least one joint of the user, on a basis of a learned model that is constructed by learning a relation between an image of a person having a plurality of joints and coordinate information indicating positions of the plurality of joints.

14. An information processing apparatus comprising:
one or more processors; and
one or more computer-readable media that, when executed, cause the information processing apparatus to:
acquire coordinate information from an imaging apparatus comprising a first image sensor for generating a first image signal by synchronously scanning all pixels at a predetermined timing, the imaging apparatus configured to perform image capturing in either a first imaging mode in which an image is captured from a first-person viewpoint corresponding to a user's viewpoint or a second imaging mode in which the image of the user is captured from a third-person viewpoint with respect to the user, the imaging apparatus further configured to recognize the user on a basis of the first image signal, calculate the coordinate information regarding the user on the basis of the first image signal, and output the coordinate information;
determine whether the image capturing is performed in the first imaging mode or the second imaging mode, on a basis of the coordinate information; and
perform, in a case where it is determined that the image capturing is performed in the first imaging mode, a first process on a basis of the coordinate information calculated in the first imaging mode and that performs, in a case where it is determined that the image capturing is performed in the second imaging mode, a second process on a basis of the coordinate information calculated in the second imaging mode.

15. An information processing method comprising:
acquiring a first image signal from an imaging apparatus that includes a first image sensor for generating the first image signal by synchronously scanning all pixels at a predetermined timing and that performs image capturing in either a first imaging mode in which an image is captured from a first-person viewpoint corresponding to a user's viewpoint or a second imaging mode in which the image of the user is captured from a third-person viewpoint with respect to the user;

recognizing the user on a basis of the first image signal and calculating coordinate information regarding the user on the basis of the first image signal;

determining whether the image capturing is performed in the first imaging mode or the second imaging mode, on a basis of the coordinate information; and performing, in a case where it is determined that the image capturing is performed in the first imaging mode, a first process on a basis of the coordinate information calculated in the first imaging mode and performing, in a case where it is determined that the image capturing is performed in the second imaging mode, a second process on a basis of the coordinate information calculated in the second imaging mode.

16. A non-transitory, computer-readable storage medium containing a computer program, which when executed by a computer, causes the computer to carry out actions, comprising:

acquiring a first image signal from an imaging apparatus that includes a first image sensor for generating the first image signal by synchronously scanning all pixels at a predetermined timing and that performs image capturing in either a first imaging mode in which an image is captured from a first-person viewpoint corresponding to a user's viewpoint or a second imaging mode in which the image of the user is captured from a third-person viewpoint with respect to the user;

recognizing the user on a basis of the first image signal and calculating coordinate information regarding the user on the basis of the first image signal;

determining whether the image capturing is performed in the first imaging mode or the second imaging mode, on a basis of the coordinate information; and performing, in a case where it is determined that the image capturing is performed in the first imaging mode, a first process on a basis of the coordinate information calculated in the first imaging mode and performing, in a case where it is determined that the image capturing is performed in the second imaging mode, a second process on a basis of the coordinate information calculated in the second imaging mode.

* * * * *